United States Patent
Sudo et al.

(10) Patent No.: US 9,310,738 B2
(45) Date of Patent: Apr. 12, 2016

(54) IMAGE FORMING APPARATUS, PRINT DATA PRODUCING APPARATUS AND IMAGE FORMING SYSTEM

(71) Applicant: Oki Data Corporation, Tokyo (JP)

(72) Inventors: Takao Sudo, Tokyo (JP); Miwako Ishii, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/520,015

(22) Filed: Oct. 21, 2014

(65) Prior Publication Data

US 2015/0110507 A1 Apr. 23, 2015

(30) Foreign Application Priority Data

Oct. 21, 2013 (JP) .................................. 2013-218390
Nov. 21, 2013 (JP) .................................. 2013-240738

(51) Int. Cl.
*G03G 15/01* (2006.01)
*G03G 15/00* (2006.01)
*G03G 15/041* (2006.01)
*H04N 1/58* (2006.01)

(52) U.S. Cl.
CPC .............. *G03G 15/50* (2013.01); *G03G 15/041* (2013.01); *G03G 15/6585* (2013.01); *H04N 1/58* (2013.01)

(58) Field of Classification Search
CPC .... G03G 15/50; G03G 15/01; G03G 15/0126
USPC ............................... 399/40, 82, 231, 342, 407
See application file for complete search history.

(56) References Cited

U.S. PATENT DOCUMENTS

| | | | | |
|---|---|---|---|---|
| 4,873,552 | A | * | 10/1989 | Otsuki .......................... 399/143 |
| 2005/0185979 | A1 | * | 8/2005 | Inoue et al. ..................... 399/82 |
| 2008/0278757 | A1 | | 11/2008 | Wong |
| 2013/0101316 | A1 | | 4/2013 | Stelter et al. |

FOREIGN PATENT DOCUMENTS

| | | |
|---|---|---|
| JP | 2000-255124 A | 9/2000 |
| JP | 2007-079262 A | 3/2007 |
| JP | 2008-193706 A | 8/2008 |
| JP | 2008-244593 A | 10/2008 |

* cited by examiner

*Primary Examiner* — Hoang Ngo
(74) *Attorney, Agent, or Firm* — Rabin & Berdo, P.C.

(57) ABSTRACT

A first developer image is overprinted on a second developer image printed on a medium. A user inputs, through an inputting section, a magnification ratio or a reduction ratio of at least one of the first developer image and the second developer material image that should be printed. The magnification and the reduction ratios are applied vertically and horizontally substantially. A data parser performs parsing of print data. A magnification/reduction section produces the first image and the second image from the print data based on a result of the parsing. The first image is subjected to a variable magnification process. An image forming section transfers and fixes the first developer material image onto the medium after the variable magnification process, and then transfers and fixes the second developer material image on the medium so that the first and second developer material images are placed one over the other.

14 Claims, 18 Drawing Sheets

IMAGE FORMING APPARATUS, PRINT DATA PRODUCING APPARATUS AND IMAGE FORMING SYSTEM

BACKGROUND OF THE INVENTION

1. Field of the Invention

The present invention relates to an image forming apparatus that prints an image directly on an image that has been previously printed on a medium, a print data producing apparatus, and an image forming system.

2. Description of the Related Art

A conventional electro photographic image forming apparatus operates so that a developer image is first transferred onto a print medium and is then fixed by heat and pressure. When heat is applied to the developer image on the print medium, the printed image and the print medium can shrink by a certain percentage. For example, when a preceding image is formed on the print medium and then a following image smaller than the preceding image is printed directly on the preceding image, the following image may also shrink but probably by a different percentage from the preceding image. The resultant image printed on the print medium is not exactly the same as what appears on the monitor of, for example, of a personal computer (PC). This is due to the fact that the relation in size between the preceding image and the following image, which are printed on the print medium, is different from that between the preceding image and the following image, which appear on the monitor of, for example, a personal computer.

A conventional image forming apparatus employs a sensor or sensors incorporated therein for measuring the size of the print medium and/or the image printed on the print medium. The sensors measure the size of the print medium before an image is printed on the print medium, and then measure the size of the print medium and the printed image after the image has been printed, thereby determining their reduction ratios. The following image is printed with a substantially the same reduction ratio as the preceding image.

A sensor or sensors for measuring the size or dimension of images and print medium adds to the cost and the number of parts of the image forming apparatus.

Drawbacks due to shrinkage of print medium occur not only in a duplex printing but also in printing a special color image (e.g., white or transparent). Special color toners including white and transparent toners are designed such that special color toner does not mix with cyan, magenta, yellow, and black toners. A special color toner layer is laid on or under the cyan, magenta, yellow, and black images. Thus, in order to print the special color image, the special color image needs to be transferred and fixed in a first pass printing process or in the second pass printing process depending on the order of images are transferred and fixed and the order in which a plurality of image forming sections for printing the cyan, magenta, yellow, and black images.

With an image forming apparatus in which black, cyan, magenta, and yellow images are transferred onto the print medium in this order, a special color image (e.g., transparent) may be transferred over the uppermost of the black, cyan, magenta, and yellow images. If the special color image is to be printed as a background which is the lowermost of the black, cyan, magenta, and yellow images, only the special color image needs to be transferred and fixed before the black, cyan, magenta, and yellow images are transferred and fixed. When a plurality of images are to be transferred and fixed in a plurality of steps on a print medium, one or more of the images need to be magnified or reduced in size before printing, thereby minimizing a drawback resulting from shrinkage of the print medium due to heat during fixing.

The special color image needs to be produced in accordance with the black, cyan, magenta, and yellow images. In other words, the special color, black, cyan, magenta, and yellow images initially have the same size, and then some of the images needs to be magnified or reduced. When an image is reduced, the image is thinned or mottled. If the image is magnified or reduced in size using, for example, a dithering pattern in accordance with a desired output resolution, the dithering period tends to deviate from what it was.

SUMMARY OF THE INVENTION

An object of the invention is to solve the aforementioned drawbacks.

Another object of the invention is to measure the reduction ratio of images printed on the print medium without the need for employing a sensor or sensors that measure the size and dimension of the print medium and/or images printed on the print medium.

Still another object of the invention is to minimize the number of parts and cost of an image forming apparatus.

Yet another object is to minimize deterioration of image quality when preceding images are transferred and fixed on the print medium in a preceding pass printing process and then following images are transferred and fixed on the preceding images in a following pass printing process.

A first developer image is overprinted on a second developer image printed on a medium. A user inputs, through an inputting section, a magnification ratio or a reduction ratio of at least one of the first developer image and the second developer material image that should be printed. The magnification and the reduction ratios are applied vertically and horizontally substantially. A data parser performs parsing of print data. A magnification/reduction section produces the first image and the second image from the print data based on a result of the parsing. The first image is subjected to a variable magnification process. An image forming section transfers and fixes the first developer material image onto the medium after the variable magnification process, and then transfers and fixes the second developer material image on the medium so that the first and second developer material images are placed one over the other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limiting the present invention, and wherein.

DETAILED DESCRIPTION OF THE INVENTION

Figure 1:
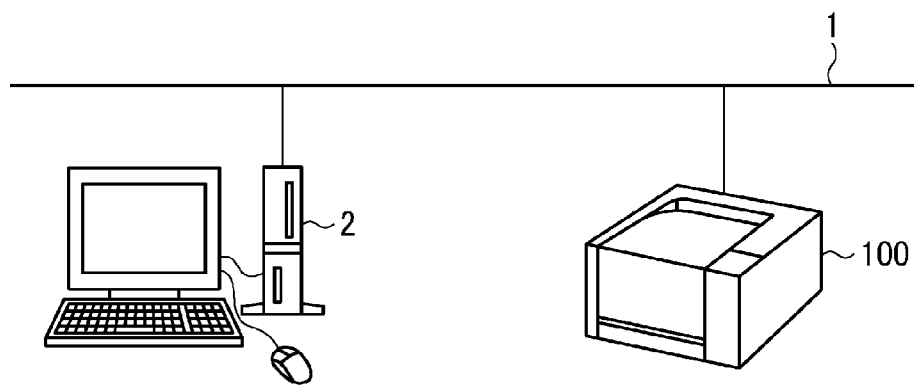
FIG. 1 illustrates the outline of a network system according to a first embodiment.

Embodiments of the present invention will be described in detail with reference to the accompanying drawings.
First Embodiment FIG. 1 illustrates the outline of a network system 1 according to a first embodiment. The network system 1 includes an electro photographic printer 100 and a personal computer PC 2 that communicates with the printer 100.

The printer 100 receives print data from the PC 2, and produces image data from the print data. A developer image is formed on a photoconductive drum (not shown) based on the image data, and the developer image is then transferred onto a print medium (e.g., paper). The printer 100 includes a plurality of image forming sections or print engines that produce a full color image using cyan (C), magenta (M), yellow (Y), black (K), and white (W) developer materials. The print data contains color information which indicates colors to be printed.

The print data includes CMYK image data and W image data. The CMYK image data contains image data for at least one of cyan, magenta, yellow, and black images. The printer 100 is capable of performing overprinting. In other words, one of the CMYK image data and the W image data is printed as an under printed image on the front surface of the paper. The other of the CMYK data and the W image data is then printed as an overprinted image on the under printed image. Overprinting includes two printing processes: a first pass printing process in which an image is printed based on first image data and a second pass printing process in which another image is overprinted on the under printed image page based on second image data. In the specification, the term printed image covers any image that is printed on the paper, including under printed images, overprinted images, and both under printed images and overprinted images.

Figure 2:
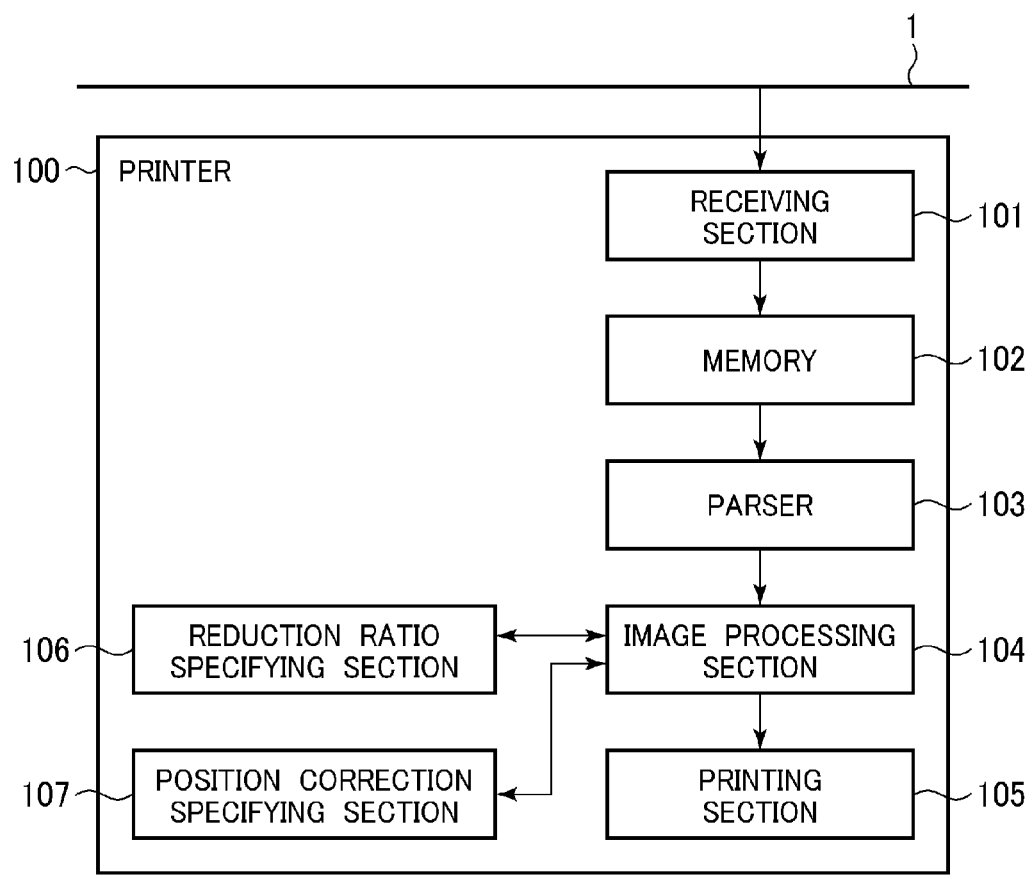
FIG. 2 is a block diagram illustrating the outline of a printer.

FIG. 2 is a block diagram illustrating the outline of the printer 100. The printer 100 includes a receiving section 101, a memory 102, a parser 103, an image processing section 104, a reduction ratio specifying section 106, a position correction specifying section 107, and a printing section 105. The receiving section 101 receives the print data from the PC 2 over the network 1 shown in FIG. 1. The memory 102 stores the print data received through the receiving section 101.

The parser 103 performs parsing of the color information contained in the print data held in the memory 102 to determine whether the print data contains data for a white image. If the print data contains data for a white image, the image processing section 104 produces the CMYK image data and the white image data from the print data. The user is allowed to select one of the CMYK image data and the white image data as the first image data and the other of the CMYK image data and the white image data as the second image data.

The image processing section 104 shrinks the size of the image described by the second image data in accordance with an image reduction ratio, which is specified by the user through the reduction ratio specifying section 106. In accordance with a magnitude of position correction specified by the user through the position correction specifying section 107, the image processing section 104 corrects the print position where the second image should be printed. Image reduction ratio refers to a degree of shrinkage when the printed image shrinks in size together with the paper due to heat applied to the developer image during the first pass printing process. The term magnitude of position correction refers to a magnitude of position by which at least one of the first image and the second image should be displaced on the print medium. A magnitude of position correction is equal to a magnitude of deviation of print position when the position of printed image deviates from where it should be printed during the first pass printing process, or a magnitude of deviation of print position when the printed image deviates from where it should be printed during the second pass printing process.

The reduction ratio specifying section 106 allows the user to specify the image reduction ratio of the second image data used in the second pass printing process. The position correction specifying section 107 allows the user to specify magnitudes of position correction of the first and second image data in a direction parallel to the paper's shorter dimension (first direction) and in a direction parallel to the paper's longer dimension (second direction).

The printing section 105 prints the first developer image on the paper based on the first image data, and then overprints the shrunk second developer image on the first image. The printing section 105 also prints the second developer image with a magnitude of position correction, which will be described later. The printer 100 with the above-described configuration includes a controller implemented with a central processing unit (CPU), the controller performing the overall control of the printer 100 under control of a control program stored in the memory 102.

Figure 3:
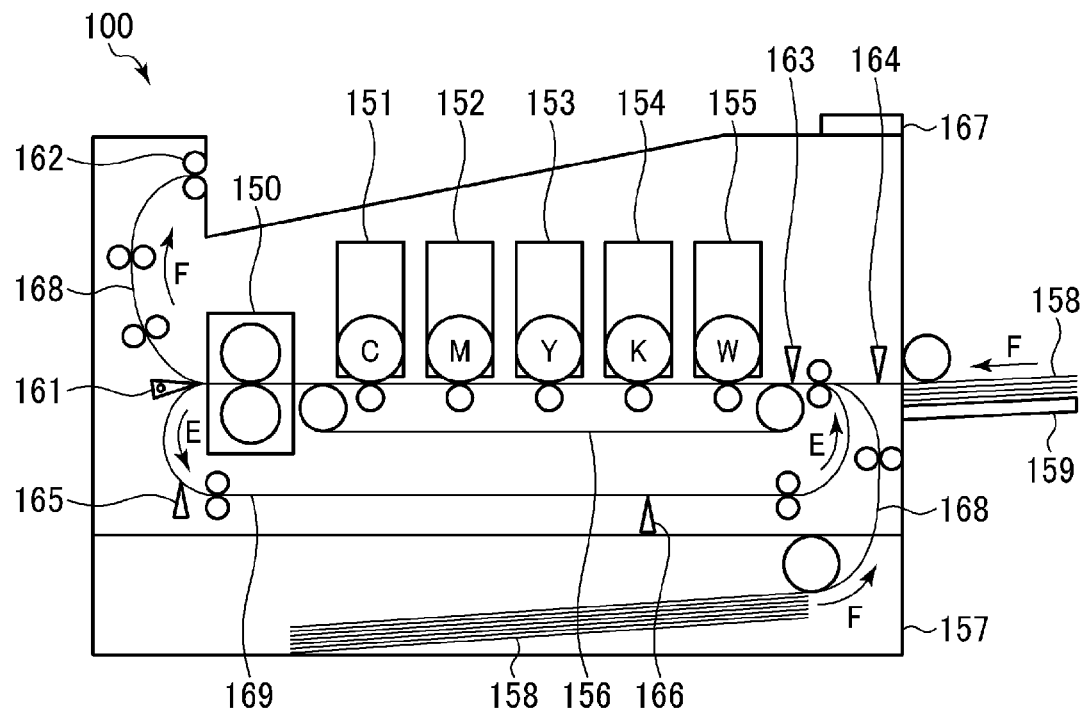
FIG. 3 is a schematic cross-sectional view of the printer.

FIG. 3 is a schematic cross-sectional view of the printer 100. A human interface 167 receives commands from the user, and displays various messages to the user. A multipurpose tray 159 and a tray unit 157 feed paper 158 to image drum units 151-155. The image drum units 151-155 bear developer images formed of developer materials of corresponding colors thereon, and transfer the developer images onto the paper 158 carried on a belt 156. A fixing unit 150 fixes the developer images on the paper 158 by heat. Discharge rollers 162 discharge the paper 158 onto a stacker after the paper 158 leaves the fixing unit 150. A transport path 168 guides the paper 158 from the tray unit 157 or the multipurpose tray 159 to the discharge rollers 162. An overprinting path 169 guides the paper 158 so that the paper 158 advances through the image drum units 151-155 during the second pass printing process. A router 161 switches the direction of travel of the paper 158 after the paper 158 has passed through the fixing unit 150. Medium sensors 163-166 detect the presence and absence of the paper 158.

The human interface 167 takes the form of a display device with a command/data inputting section, e.g., a touch screen. The human interface 167 displays information to the user and receives commands and various items of information from the user. The human interface 167 displays a white printing setting screen 170 (FIG. 4), a reduction ratio setting screen 171 (FIG. 10) and a magnitude of position correction inputting screen (FIG. 11). The human interface 167 allows the user to select the settings for overprinting (later described Color-On-White mode and White-On-Color mode) and to specify the image reduction ratio and the magnitude of position correction. The tray unit 157 and multipurpose tray 159 feed the paper 158 to the image drum units 151-155 through the transport path 168.

The image drum units 151-155 form developer images of corresponding image data, and transfer the developer images onto the paper 158 carried on the belt 156. The fixing unit 150 fixes the developer images on the paper 158 by heat. This heat can cause the paper 158 and the printed image to shrink. The discharge rollers 162 discharge the paper 158 that left the fixing unit 150.

The transport path 168 is a path in which the paper 158 travels from the tray unit 157 or the multipurpose tray 159 to the discharge rollers 162 in a direction shown by arrow F. The overprinting transport path 169 is a path that branches from the transport path 168 at a location downstream of the fixing unit 150. The paper 158 advances in the overprinting transport path 169 during the second pass printing process so that the paper 158 again passes through the image drum units 151-155. The router 161 is disposed at the location where the overprinting transport path 169 branches from the transport path 168. When overprinting is performed, the router 161 causes the paper 158 to advance into the overprinting transport path 169 in the first pass printing process, so that the paper 158 again advances through the image drum units 151-155 in sequence. The router 161 guides the paper 158 through the transport path 168 in the second pass printing process. The medium sensors 163-166 are disposed along the transport path 168 toward the stacker and the overprinting transport path 169, and detect the presence and absence of the paper 158.

{Overprinting}

Figure 4:
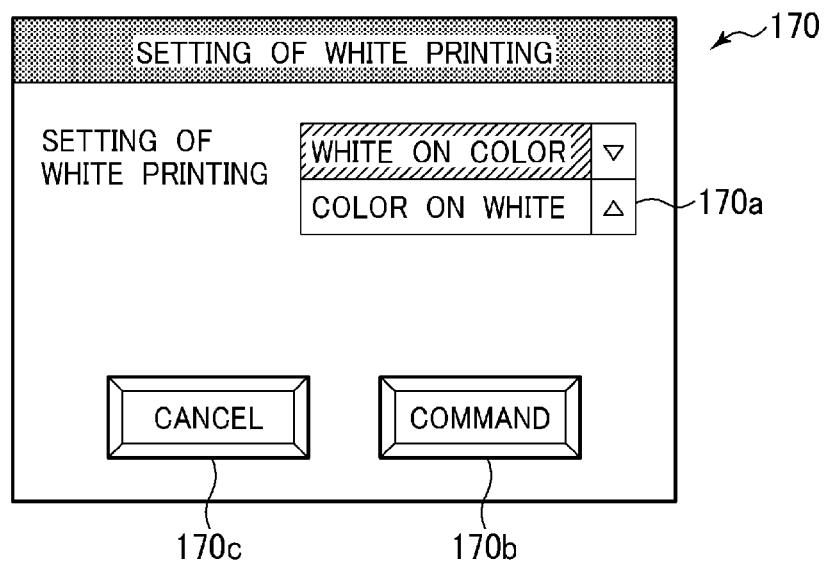
FIG. 4 illustrates a white printing setting screen displayed on a human interface.

The overprinting performed by the printer 100 will be described with reference to FIGS. 4 and 5. FIG. 4 illustrates a white printing setting screen displayed on the human interface 167. The white printing setting screen prompts the user to select one of the CMYK image data and the white image data as an under printed image or a first image and the other of the CMYK image data and the white image data as an overprinted image or a second image.

Figure 5A:
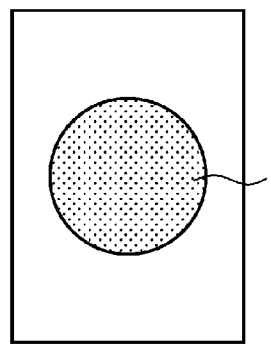
FIGS. 5A and 5C illustrate print results when the "White On Color" mode is selected and the "Color On White" mode is selected.
Figure 5B:
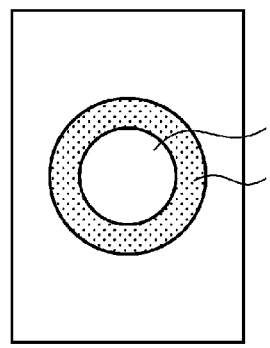
FIGS. 5B and 5D illustrate print results when the "Color On White" mode is selected.
Figure 5C:
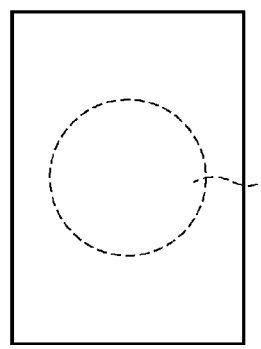
Figure 5D:
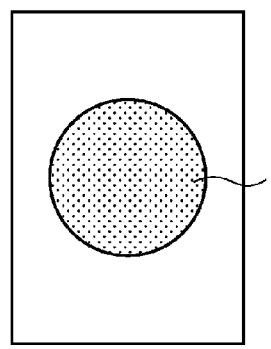

The user selects either a "White On Color" mode or a "Color On White" mode through a select box 170a, and presses a COMMAND button 170bal. Once the user presses a CANCEL button 170cal, the select box 170a returns to the "White On Color" mode, which is a default setting. FIGS. 5A and 5C illustrate print results when the "White On Color" mode is selected and when the "Color On White" mode is selected, respectively. FIGS. 5B and 5D illustrate print results when the "Color On White" mode is selected.

When the "White On Color" mode is selected, the printer 100 prints a CMYK image as an under printed image on the paper 158 in the first pass printing process, and then overprints the white image W on the under printed image in the second pass printing process. Referring to FIG. 5A, a disc-like cyan image C is under printed on the paper in the first pass printing process. Referring to FIG. 5B, a disc-like white image W smaller than the cyan under printed image C is solid-printed on the cyan under printed image C in the second pass printing process.

When the "Color On White" mode is selected, the printer 100 prints a disc-like white image W as an under printed image on the paper 158 in the first pass printing process as shown in FIG. 5C and then overprints a disk-like cyan image C on the under printed white image W in the second pass printing process as shown in FIG. 5D. The disc-like cyan image C shown in FIG. 5D has the same diameter as the disc-like white under printed image W shown in FIG. 5C. For example, when a CMYK image is to be printed on a dark medium, e.g., "dark T-shirt," if the CMYK image is directly printed on the dark T-shirt, the CMYK image looks discolored due to the dark background. A known fact is that if a white under printed image W is first printed on a dark medium and then a CMYK image is overprinted on the white under printed image W, the CMYK image looks very vivid.

Figure 6:
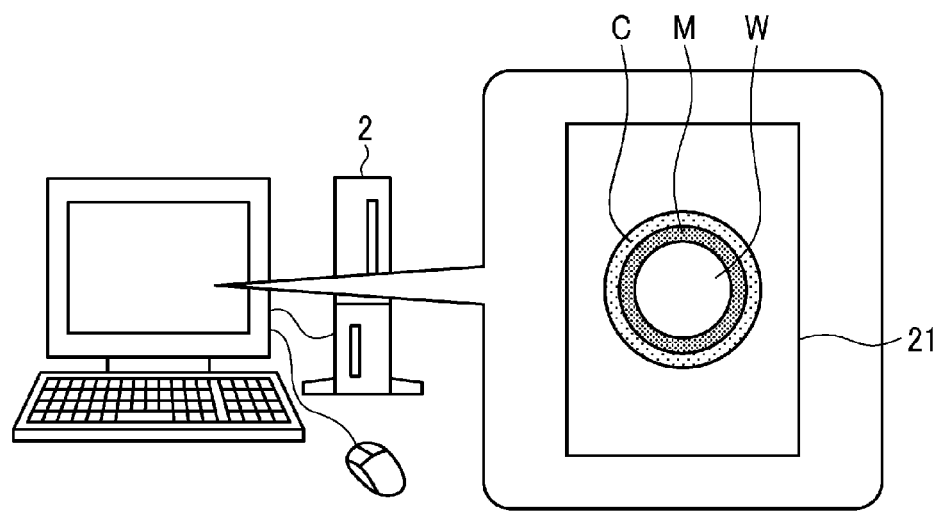
FIG. 6 illustrates an image on the screen of a PC.

The deterioration of image quality due to shrinkage of paper will be described with reference to FIGS. 6 and 7. FIG. 6 illustrates an image displayed on the screen of the PC 2. A poor print quality results from the fact that the dimensional ratio of the image (e.g., cyan and magenta) printed in the first pass printing process to the image (e.g., white) printed in the second pass printing process may differ from the dimensional ratio of the cyan and magenta images to the white image which are displayed on the PC screen.

The image on the PC screen includes a cyan disc C, a magenta disc M having a smaller diameter than the cyan disc, and a white disc W having a smaller diameter than the magenta disc M, which are placed one over the other in this order and are disposed in the middle of the PC screen. FIGS. 7A-7F illustrate the deterioration of image quality due to the shrinkage of the paper when the print data for the image shown in FIG. 6 is actually printed by the printer 100.

Figure 7A:
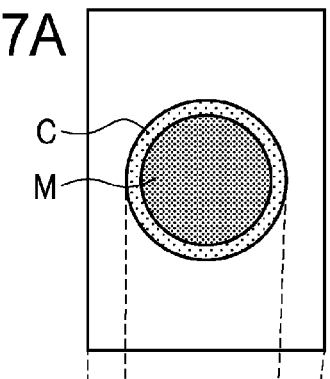
FIGS. 7A and 7B illustrate a print result when paper does not shrink and therefore a white image is overprinted without any image reduction ratio applied.
Figure 7B:
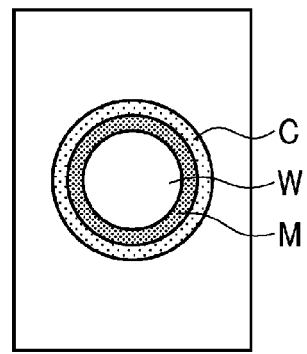

FIGS. 7A and 7B illustrate a print result when the paper does not shrink and therefore the white image W is overprinted on the magenta image M without any image reduction ratio applied.

Figure 7C:
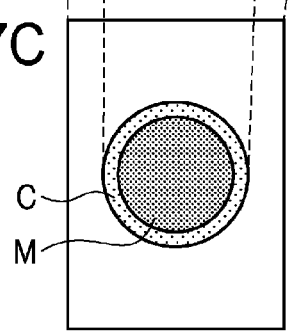
FIGS. 7C and 7D illustrate a print result when the paper shrinks but the white image is overprinted without any image reduction ratio.
Figure 7D:
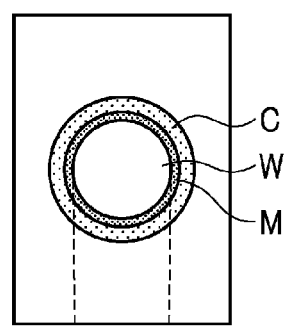

FIGS. 7C and 7D illustrate a print result when the paper shrinks but the white image W is overprinted onto the magenta image M without any image reduction ratio.

Figure 7E:
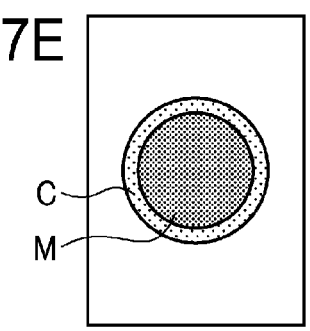
FIGS. 7E and 7F show print results in the "White On Color" mode when the paper shrinks and the white image is printed with an image reduction ratio applied.
Figure 7F:
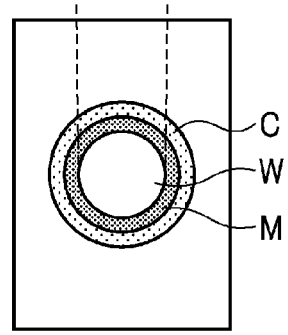

FIGS. 7E and 7F show print results when the paper shrinks and the white image W is printed onto the magenta image M with an image reduction ratio applied, the images being printed in the "White On Color" mode in which the cyan and magenta images are first printed and then the white image W is overprinted on the cyan and magenta images. Paper shrinks mainly due to the loss of some moisture contained therein. When the paper 158 passes through the fixing unit 150 shown in FIG. 3, some moisture in the paper evaporates due to heat applied thereto. The reduction ratio of the paper greatly depends on environmental conditions such as temperature and humidity at which the paper is stored and/or the printer 100 operates.

As shown in FIG. 7A, a magenta disc M and a cyan ring C are printed on the paper in the first pass printing process so that the inner perimeter of cyan ring C is contiguous with the magenta disc M. As shown in FIG. 7B, a white disc W having a smaller diameter than the magenta disc M is then overprinted on the magenta disc M in the second pass printing process. It is to be noted that the dimensional ratio of the cyan C and magenta M images to the white image W which are printed on the paper is substantially the same as that of the cyan C and magenta M images to the white image W which are displayed on the PC screen. However, it is to be noted that the print results shown in FIGS. 7A and 7B are an ideal case.

A description will be given of a real case in which paper actually shrinks.

Referring to FIG. 7C, a magenta disc M and a cyan ring C are printed in the first pass printing process on the paper 158 so that the inner perimeter of cyan ring C is contiguous with the magenta disc M. The paper 158 shrinks due to heat applied by the fixing unit 150 during the first pass printing process, and so do the magenta M and cyan C images. As shown FIG. 7D, a white disc W is then overprinted on the magenta image M in the second pass printing process but the white disc W does no shrink significantly since the paper 158 has already shrunk in the first pass printing process.

This causes the dimensional ratio of the cyan C and magenta M images to the white image W which are printed on the paper to be different from that of the cyan C and magenta M images to the white image W which are displayed on the PC screen, leading to a poor print quality.

Referring to FIG. 7E, a magenta disc M and a cyan ring C are printed in the first pass printing process on the paper so that the inner perimeter of cyan ring C is contiguous with the magenta disc M. The paper shrinks due to heat applied by the fixing unit 150 during the first pass printing process, and so do the printed magenta M and printed cyan C images. As shown in FIG. 7D, a white disc W is overprinted on the magenta image M in the second pass printing process, being printed with the same reduction ratio as the paper. As a result, the dimensional ratio of the cyan C and magenta M images to the white image W which are printed on the paper is substantially equal to that of the cyan C and magenta M images to the white image W which are displayed on the PC screen, providing a good print quality.

{Determining Image Reduction Ratio}

Figure 8:
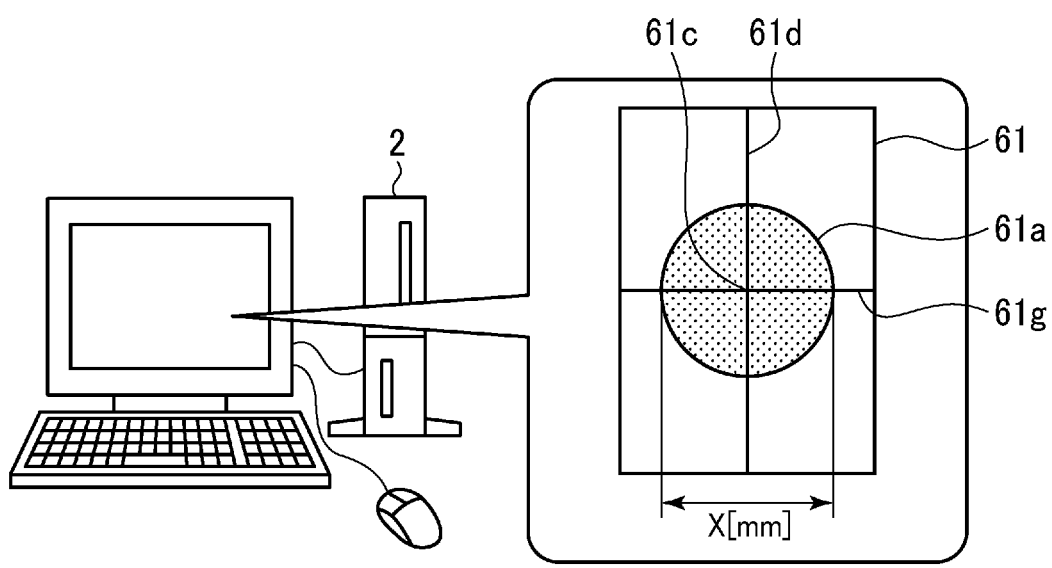
FIG. 8 illustrates a test pattern displayed on the PC.

With reference to FIGS. 8 and 9, a description will now be given of how to determine the image reduction ratio of a printed image and the magnitude of positional deviation of the printed image. FIG. 8 illustrates a test pattern 61 displayed on the PC 2. The test print data is used for determining the image reduction ratio of a printed image and the magnitude of position deviation of the printed image. The test pattern 61 has a center line 61d extending from one short side of the test paper 61 to another, another center line 61g extending from one long side of the test paper 61 to another, and a disc 61a having a diameter of X mm and a center 61c at a location where the center lines 61d and 61g intersect.

FIGS. 9A-9E illustrate the measurements of the image reduction ratio of a printed image and the magnitude of a position error of the printed image.

Figure 9A:
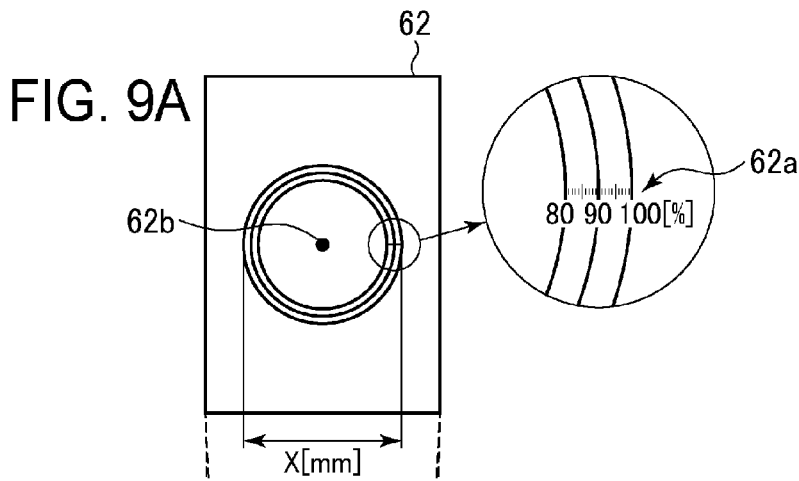
FIG. 9A illustrates a reference sheet used in measuring the image reduction ratio of a printed image.

FIG. 9A illustrates a reference sheet 62 used in measuring the image reduction ratio of an image printed on the paper. The reference sheet 62 is, for example, an A4 size transparency on which a plurality of concentric circles with different diameters are printed and are partially calibrated at a scale 62a.

A description will be given of how the image reduction ratio of a printed image is measured.

It is assumed that the transparent reference sheet 62 does not shrink due to heat. The scale 62a is calibrated in increments of 1%, and is used to detect the image reduction ratio of the printed image. The largest circle having a diameter of X mm shows the size of an image that has not shrunk. The circle having a diameter of 0.9× has an image reduction ratio of 90%, i.e., the printed image has a size of 90% of that of the largest circle. The circle having a diameter of 0.8× has an image reduction ratio of 80%, i.e., the printed image has a size of 80% of that of the largest circle.

Figure 9B:
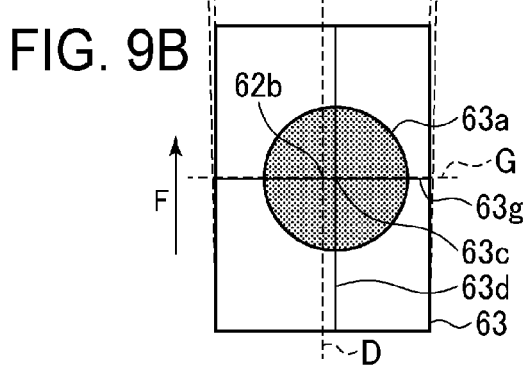
FIG. 9B illustrates test paper on which a disc has been printed in a first pass printing process with its center deviating rightward from the center of the reference sheet.

FIG. 9B illustrates test paper 63 on which a disc 63a has been printed in the first pass printing process with its center 63c deviating rightward from the center 62b of the reference sheet 62. Reference numeral D denotes a center line extending from one short side of the test paper 63 to another. The test paper 63 is used in measuring the position error encountered during the first pass printing process. The test sheet 64 is, for example, A4 size paper. The test sheet 63 has a center line 63d extending from one short side to another, and another center line 63g extending from one long side to another, the center lines 63d and 63g intersecting at a point 63cal. The center lines 63d and 63g correspond to the center lines 61d and 61g of the test pattern 61 (FIG. 8), respectively. The disc 61a of the test pattern 61 corresponds to the disc 63a of the test paper 63. The user overlays the reference sheet 62 onto the test paper 63 with the point 63 aligned with the center 62bal, and reads the contour of the disc 63a printed on the test paper 63 against the scale 62a. A reading of 100% implies that the paper did not shrink during the first pass printing process. In the first embodiment, the image reduction ratio is 90%.

{Measuring Magnitude of Position Correction}

Figure 9D:
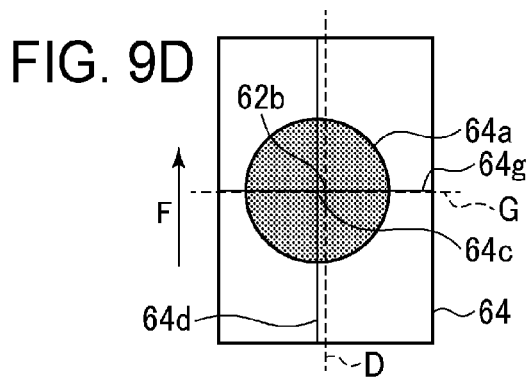
FIG. 9D illustrates test paper on which a disc has been printed in a second pass printing process with its center deviating leftward from the center of the reference sheet.
Figure 9C:
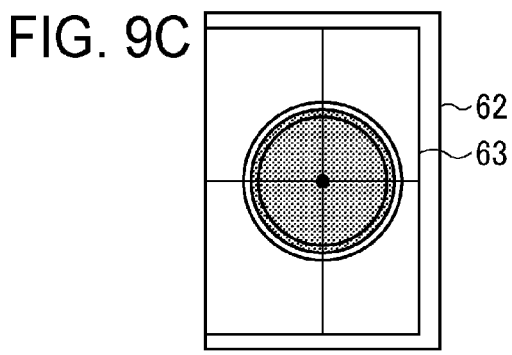
FIG. 9C illustrates the reference sheet overlaid onto the test paper with the center of the reference sheet aligned with the center of the disc.

FIG. 9C illustrates the reference sheet 62 overlaid onto the test paper 63 with the center 62*b* of the reference sheet 62 aligned with the center 63*c* of the disc 63*a*.

FIG. 9D illustrates test paper 64 on which a disc 64*a* has been printed in a second pass printing process with its center 64*c* deviating leftward from the center 62*b* of the reference sheet 62. Reference numeral D denotes a center line extending from one short side of the test paper 63 to another. The paper 64 is first fed into the fixing unit 150 with no developer image thereon. In other words, the paper 64 is merely subjected heat to shrink. Subsequently, the disc 64*a* is printed on the paper 64. The test paper 64 is used in measuring the position error encountered during the second pass printing process. The test sheet 64 is also, for example, A4 size paper.

Figure 9E:
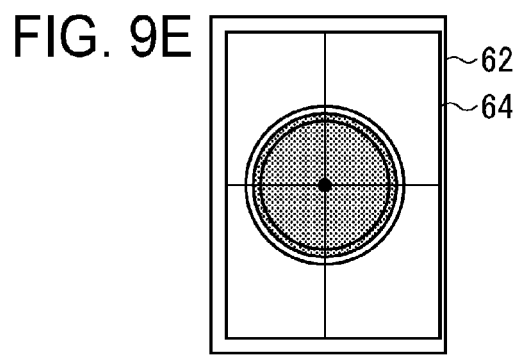
FIG. 9E illustrates the reference sheet overlaid onto the test paper with the center of the reference sheet aligned with the center of the disc.

FIG. 9E illustrates the reference sheet 62 overlaid onto the test paper 64 with the center 62*b* of the reference sheet 62 aligned with the center 64*c* of the disc 64*a*.

A description will be given of how the magnitude of position correction of a printed image is measured. The user measures a first pass position error which is a position error encountered in the first pass printing process, and a second pass position error which is a position error encountered in the second pass printing process. The position errors are measured in the direction parallel to the paper's longer dimension and in the direction parallel to the paper's shorter dimension.

The magnitude of position correction of a first pass position error in the direction parallel to the paper's longer dimension can be obtained as follows:

The user draws the center line G (FIG. 9B) on the test paper 63, the center line G extending from one long side of the test paper 63 to another. The user then measures the distance between the center line G and the center line 63*g*, using, for example, a ruler.

The magnitude of position correction of a first pass position error in the direction parallel to the paper's shorter dimension can be obtained as follows:

The user draws the center line D (FIG. 9B) on the test paper 63, the center line D extending from one short side of the test paper 63 to another. The user then measures the distance between the center line D and the centerline 63*dell*, using, for example, a ruler.

The magnitude of position correction of second pass position errors can be obtained using the test paper 64 instead of the paper 63.

The magnitude of correction of a second pass position error in the direction parallel to the paper's longer dimension can be obtained as follows:

The user draws the centerline G (FIG. 9D) on the test paper 64, the center line G extending from one long side of the test paper 64 to another. The user then measures the distance between the center line G and the center line 64*g* with a ruler, thereby determining the magnitude of position correction of the second pass position error.

The magnitude of position correction of a second pass position error in the direction parallel to the paper's shorter dimension can be obtained as follows:

The user draws the center line D (FIG. 9D) on the test paper 64, extending from one short side of the test paper 64 to another. The user then measures the distance between the center line D and the center line 64*d* with a ruler, thereby determining the magnitude of position correction of the second pass position error.

Figure 10:
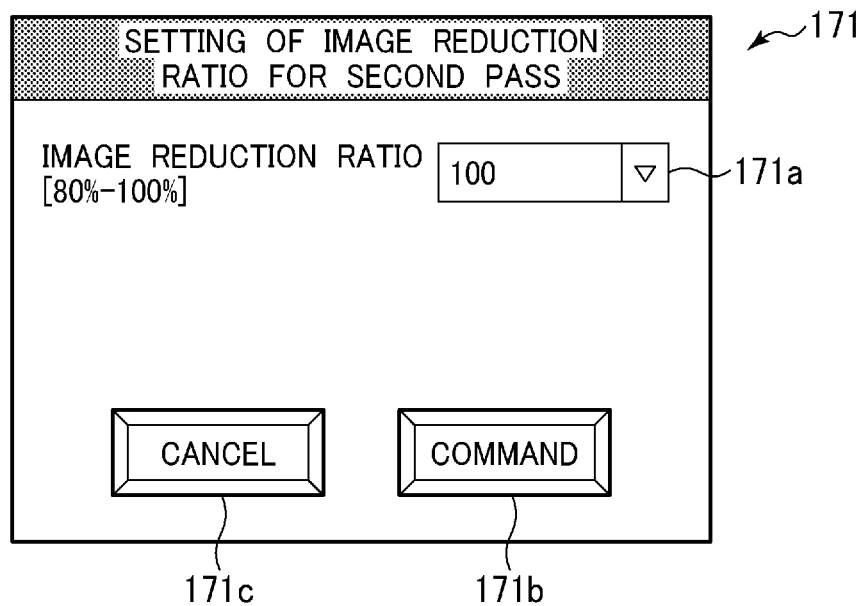
FIG. 10 illustrates a reduction ratio inputting screen which appears on the human interface.

With reference to FIGS. 10 and 11A-11D, a description will be given of how the image reduction ratio and the magnitude of position correction of a printed image are set. FIG. 10 illustrates a reduction ratio inputting screen 171 which appears on the human interface 167 (FIG. 3). The user selects one of the image reduction ratios in the range of 80-100% through a select box 171*a*, and then presses the COMMAND button 171*b*. The default setting of the image reduction ratio is 100%, i.e., no shrinkage. When a CANCEL button 171*c* is pressed, the image reduction ratio returns to 100%.

As described above, the user measures the image reduction ratio, and then inputs the measured image reduction ratio into the printer 100 through the select box 171*a*, so that the dimensional ratio of the cyan C and magenta M images to the white image W which are printed on the paper is substantially the same as that of the cyan C and magenta M images to the white image W which are displayed on the PC screen. This configuration eliminates the need for employing a sensor or sensors that detect the dimensions of the paper after the first and second pass printing processes. This configuration may be incorporated as a standard function into the printer 100.

Figure 11A:
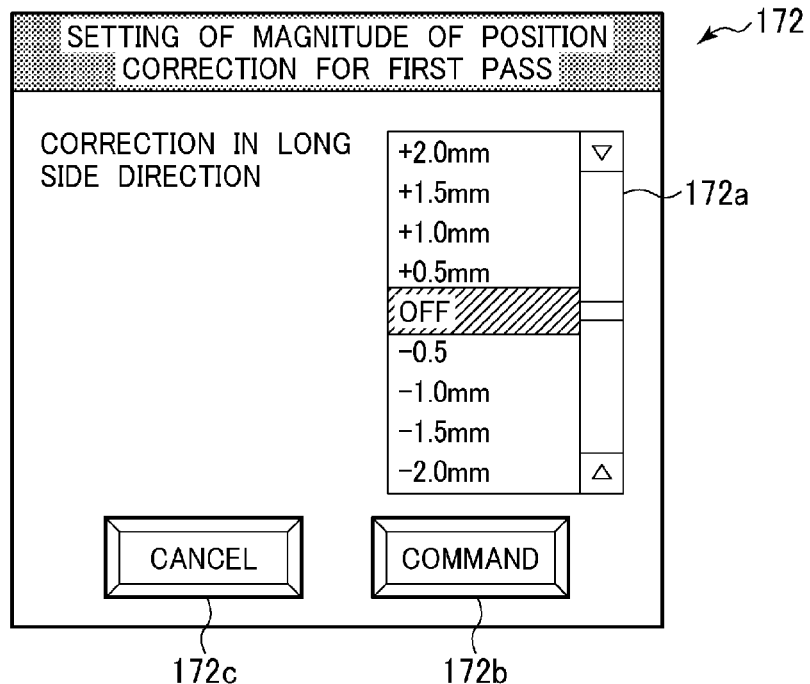
FIG. 11A illustrates a position correction inputting screen through which the user inputs a magnitude of position correction in a direction parallel to the paper's longer dimension for the first pass printing process.
Figure 11B:
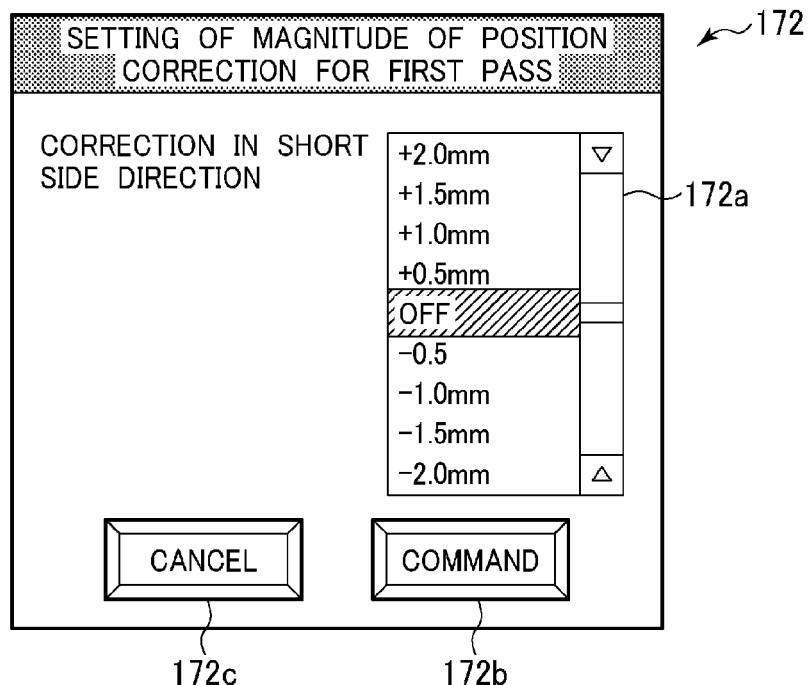
FIG. 11B illustrates the position correction inputting screen through which the user inputs a magnitude of position correction in a direction parallel to the paper's shorter dimension for the first pass printing process.

FIGS. 11A-11D illustrate a position correction inputting screen 172, which appears on the human interface 167 (FIG. 3). FIG. 11A illustrates the position correction inputting screen 172 through which the user inputs the magnitude of position correction in the direction parallel to the paper's longer dimension for the first pass printing process. FIG. 11B illustrates the position correction inputting screen 172 through which the user inputs the magnitude of position correction in the direction parallel to the paper's shorter dimension for the first pass printing process. After inputting the magnitude of position correction, the user presses the COMMAND button 172*b*. The default setting of the correction of print position is OFF (e.g., ±0 mm). Upon pressing the CANCEL button 172*c*, the magnitude of position correction returns to the default setting.

Figure 11C:
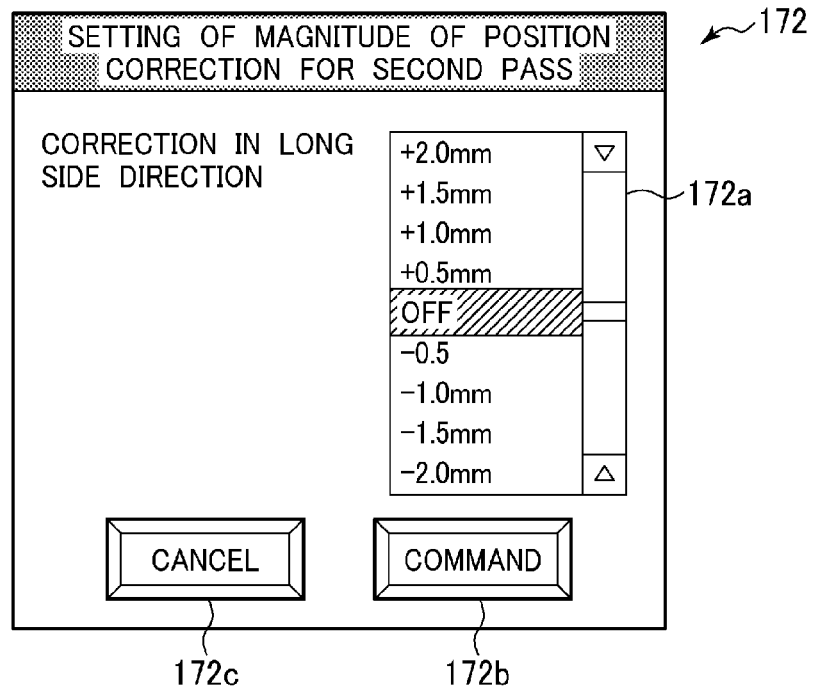
FIG. 11C illustrates the position correction inputting screen through which the user inputs a magnitude of position correction in a direction parallel to the paper's longer dimension for a second pass printing process.
Figure 11D:
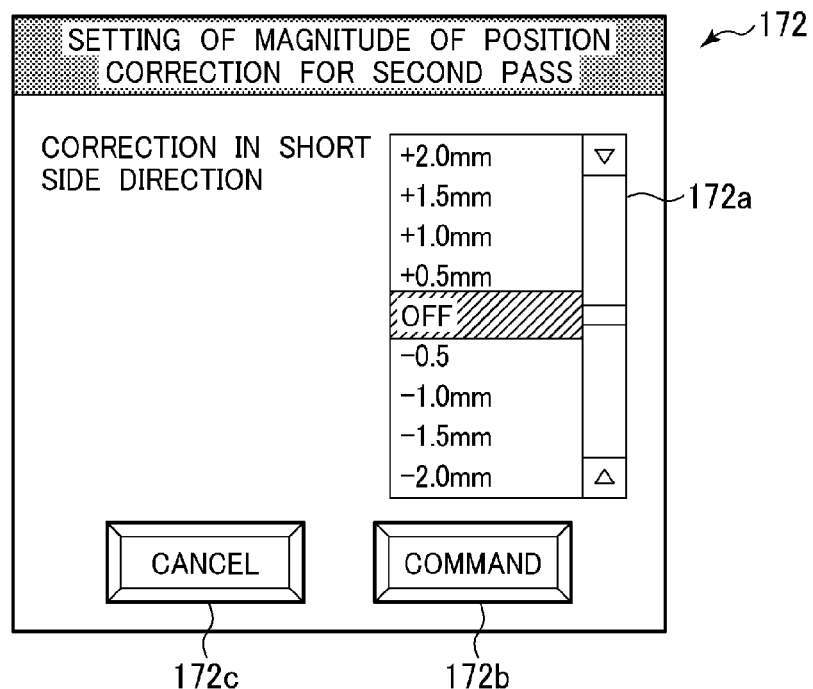
FIG. 11D illustrates the position correction inputting screen through which the user inputs a magnitude of position correction in a direction parallel to the paper's shorter dimension for the second pass printing process.

FIG. 11C illustrates the position correction inputting screen 172 through which the user inputs the magnitude of position correction in the direction parallel to the paper's longer dimension for the second pass printing process. FIG. 11D illustrates the position correction inputting screen 172 through which the user inputs the magnitude of position correction in the direction parallel to the paper's shorter dimension for the second pass printing process. After inputting the magnitude of position correction, the user presses the COMMAND button 172*b*. The default setting of the correction of print position is OFF (e.g., ±0 mm). Upon pressing the CANCEL button 172*c*, the magnitude of correction returns to the default setting.

Figure 12:
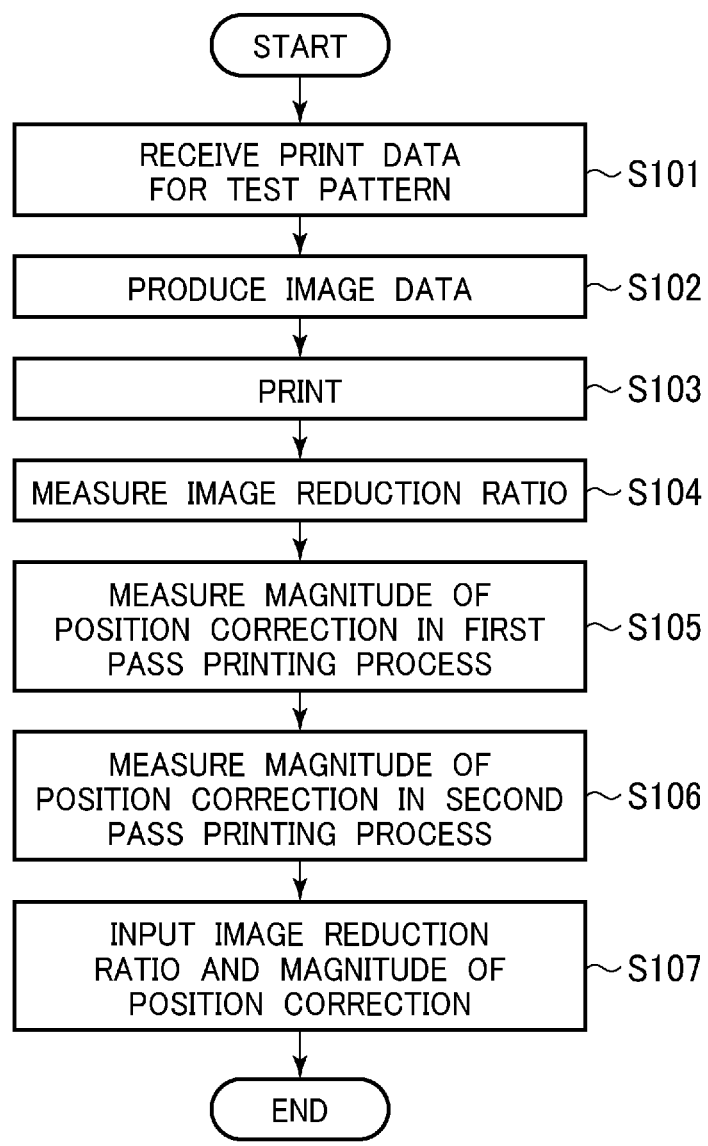
FIG. 12 is a flowchart illustrating the operation of a reduction ratio specifying section and a position correction specifying section.

FIG. 12 is a flowchart illustrating the operation of the reduction ratio specifying section and a position correction specifying section.

The measurement of the image reduction ratio and the magnitude of position correction will be described with reference to FIGS. 2, 8-11, and 12. The measurements are made prior to printing images.

S101: The receiving section 101 receives print data for the test pattern 61 from the PC 2.

S102: The image processing section 104 produces the image data from the test pattern 61 received in the receiving section 101.

S103: The printing section 105 forms a developer image from the thus produced image data, and then transfers the developer image onto the paper, thereby producing the test paper 63 shown in FIG. 9B.

S104: The user measures the image reduction ratio of the test paper 63. As explained with reference to FIG. 9, the user overlays the reference sheet 62 onto the test paper 63 with the center 62b of the reference sheet 62 aligned with the point 63cal, and then reads the contour of the disc 63a against the scale 62a.

S105: The user measures the magnitude of position correction in the first pass printing process. The magnitude of position correction in the direction parallel to the paper's longer dimension can be obtained as follows: As shown in FIG. 9B, the user draws the center line G on the test paper 63, and then measures the distance between the center line G and the center line 63g using a ruler. The magnitude of position correction in the direction parallel to the paper's shorter dimension can be obtained as follows: As shown in FIG. 9D, the user draws the center line D on the test paper 64, and then measures the distance between the center line D and the center line 64d using a ruler.

S106: The user determines the magnitude of position correction for the second pass printing process. The magnitude of position correction in the direction parallel to the paper's longer dimension can be obtained as follows: As shown in FIG. 9D, the user draws the center line G on the test paper 64, and measures the distance between the center line G and the center line 64g. The magnitude of a position correction in the direction parallel to the paper's longer dimension can be obtained as follows: As shown in FIG. 9D, the user draws the center line D on the test paper 64, and measures the distance between the center line D and the center line 64d.

S107: The user inputs the image reduction ratio obtained at S104 through the reduction ratio inputting screen 171. The user also inputs through the position correction inputting screen the magnitudes of position correction in the direction parallel to the paper's longer dimension and in the direction parallel to the paper's shorter dimension obtained at S105 and S106, respectively.

{Printing Process by Printer}

Figure 13:
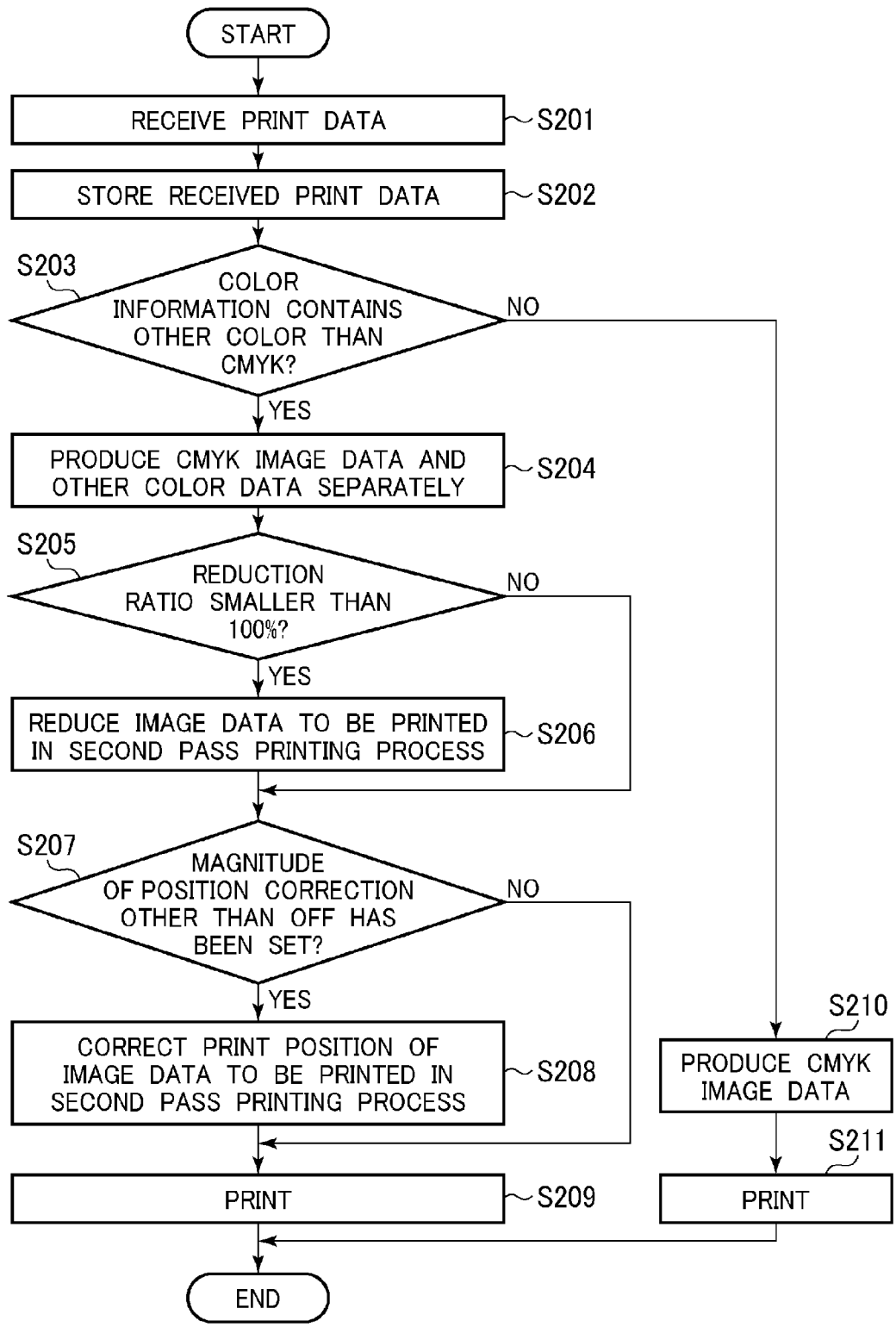
FIG. 13 is a flowchart illustrating the operation of the printer.

FIG. 13 is a flowchart illustrating the operation of the printer 100. The printing process performed by the printer 100 will be described with reference to FIGS. 2, 6, 8-11, and 13.

S201: The receiving section 101 receives the print data from the PC 2.

S202: The memory 102 stores the received print data.

S203: The parser 103 parses the color information contained in the print data stored in the memory 102 to determine whether the color information contains white W in addition to cyan C, magenta M, yellow Y, and/or black K. If the color information contains white W, then the program proceeds to S204, if not, the program jumps to S209.

S204: The image processing section 104 separately produces the CMYK image data and the white W image data from the print data.

S205: The controller determines whether an image reduction ratio smaller than 100% has been specified. If the answer is YES, then the program proceeds to S206. If the answer is NO, then the program jumps to S207.

S206: The image processing section 104 shrinks the image data to be printed in the second pass printing process, the image data being shrunk in accordance with the image reduction ratio inputted by the user.

S207: The controller determines whether any magnitude of position correction other than OFF has been set. If the answer is NO, then the program jumps to S210. If the answer is YES, the program proceeds to S208.

S208: The image processing section 104 corrects the print position of the image data to be printed in the second pass printing process, the print position being corrected in accordance with the inputted magnitude of position correction.

S209: The printing section 105 prints one of the CMYK image data and white image data as an under printed image in the first pass printing process, and then overprints the other of the CMYK image data and white image data on the under printed image in registration.

S210: The image processing section 104 produces CMYK image data from the print data stored in the memory 102.

S211: The printing section 105 prints the CMYK image data on the paper.

As described above, in the present invention, the user measures the image reduction ratio of an image printed on the print medium in the first pass printing process. This eliminates the need for sensors that measure the dimensions of the paper or the image printed on the paper before and after shrinkage. This reduces the cost and the number of parts used in the printer 100. The user also measures the magnitudes of position correction in the direction parallel to the paper's longer dimension and in the direction parallel to the paper's shorter dimension, and then inputs the magnitudes of position correction into the printer 100 through the setting screen. This configuration prevents the position of overprinted images from deviating from where they should be, enhancing the print quality of images.

The first embodiment has been described in terms of an apparatus in which the image reduction ratio and the magnitude of position correction are inputted through the human interface. The present invention is not limited to this. A host computer, for example, the PC 2 connected to the network may also send out print data that already contains the image reduction ratio and the magnitude of position correction. Although the image forming apparatus has been described in terms of a printer, the invention is not limited to this, and the image forming apparatus may also be a multi-function printer or a copier.

Second Embodiment

Figure 14:
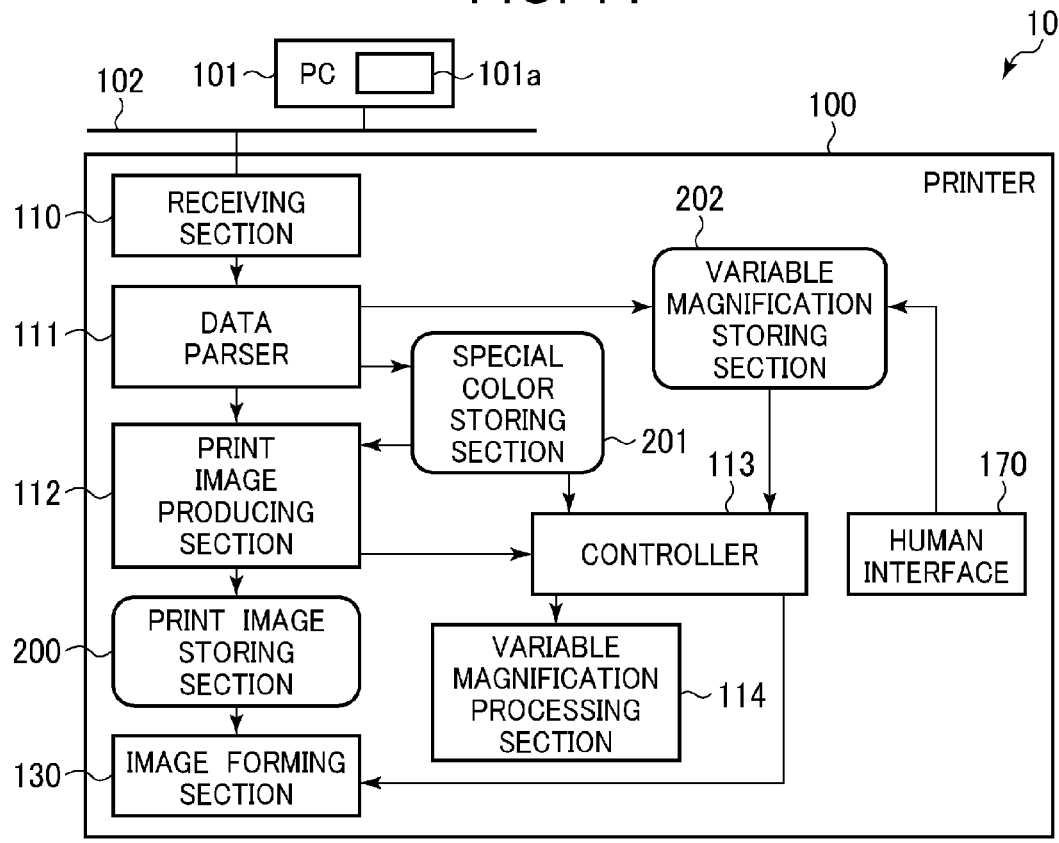
FIG. 14 is a block diagram illustrating an image forming system according to a second embodiment.

FIG. 14 is a block diagram illustrating an image forming system 10. The image forming system 10 includes an electro photographic printer 100 as an image forming apparatus and a personal computer (PC) 101 as a host apparatus that communicate with each other over a communication line 102. The PC 101 has a printer driver 101a (software) that produces print data and transmits the print data to the printer 100. The print data includes a document to be printed. The document contains printing setting information and image data (PDL data) written in a page description language (PDL), which can be parsed by a later described data parser 111 in the printer 100.

The printer 100 includes a plurality of image forming sections or print engines, each printing an image of a corresponding color in accordance with the print data produced in the printer driver 101a. The printer 100 includes a data receiving section 110, a data parser 111, a print image producing section 112, a controller 113, a variable magnification processing section 114, an image forming section 130, a human interface 170, a print image storing section 200, a special color storing section 201, and a variable magnification storing section 202. The data receiving section 110 receives the print data from the PC 101 over the communication line 102, and then transfers the print data to the data parser 111.

The data parser 111 performs parsing of the print data received from the data receiving section 110, and then stores a special color printing information into the special color storing section 201 and variable magnification information into the variable magnification storing section 202. The data parser 111 sends the PDL data to the print image producing section 112. The special color printing information and variable magnification information constitute printing setting information. The special color printing command is information about how a print image is printed using a special color toner, for example, a white toner or a transparent toner. The variable magnification information is information about a degree or magnitude when the medium shrinks due to heat applied to the developer image during fixing. The special color printing command and variable magnification information will be described later in more detail.

The print image producing section 112 produces print image data (bit map data) based on the PDL data contained in the print data and the special color printing information held in the special color storing section 201. The print image producing section 112 then stores the print image data into the print image storing section 200 and informs the controller 113 that the print image data has been produced. In the second embodiment, the print image producing section 112 produces a first image (referred to as "special color image hereinafter") and a second image (referred to as "CMYK image" hereinafter), the special color image and CMYK image being produced based on the PDL data contained in the print data and the special color printing information stored in the special color storing section 201. One of the special color image or a first developer material image and the CMYK image or a second developer material image is placed on the other of the first developer material image and the second developer material image.

In response to the notification, from the print image producing section 112, that the print image data has been produced, the controller 113 reads the special color printing information from the special color storing section 201. The controller 113 then makes a decision as to whether printing a single page requires more than one transferring operation of an image onto the medium and more than one fixing operation of an image, and whether a special color image requires to be transferred more than one time and fixed more than one time. If the decision result necessitates a variable magnification process of the print image, the controller 113 instructs the variable magnification processing section 114 to perform the variable magnification process of some of the images in accordance with the information stored in the variable magnification storing section 202. Once the variable magnification process of some of the images completes, the controller 113 instructs the image forming section 130 to print the image on which the variable magnification process has been performed.

As described above, the controller 113 instructs the variable magnification processing section 114 to set the magnification ratio for the color print image or the special color image based on one of magnification ratios stored in the variable magnification storing section 202. The magnification ratio is set by considering the order in which the image drums for forming images of the respective colors are aligned in the direction of transport path and the order in which the special color image (e.g., K-C-M-Y-W or W-K-C-M-Y) and the CMYK image are placed one over the other (e.g., special color image on the CMYK image or CMYK image on special color image). Upon completion of the variable magnification process, the controller 113 instructs the image forming section 130 to print the image that has been subjected to the variable magnification process. The magnification ratio for the color print image or the special color image is set prior to a first pass printing process and/or a second pass printing process.

Under control of the controller 113, the variable magnification processing section 114 produces the print image data by magnifying or reducing some of the image in accordance with the information stored in the variable magnification storing section 202, and then stores the print image data into the print image storing section 200. Upon completion of the variable magnification process, the variable magnification processing section 114 informs the controller 113 that the variable magnification process has been completed. In the second embodiment, the variable magnification processing section 114 magnifies or reduces the special color image and the color print image produced by the print image producing section 112 in accordance with the variable magnification information held in the variable magnification storing section 202, and then stores the special color image and the color print image into the print image storing section 200.

In accordance with the instruction from the controller 113, the image forming section 130 reads the print image data from the print image storing section 200, forms a toner image based on the print image data, then transfers the toner image onto a print medium, e.g., paper, and finally fixes the toner image on the print medium. The human interface 170 includes a display means, e.g., liquid crystal display (LCD) and inputting means, e.g., operation buttons, so that the user can operate the human interface to perform a test printing for determining a magnification ratio or reduction ratio. The magnification ratio and reduction ratio may be stored into the variable magnification storing section 202 not only by the printer driver 101a but also by the user's selection from the menu displayed on the human interface 170.

The print image storing section 200 stores the print image data produced by the print image producing section 112 and print image data produced by the variable magnification processing section 114. The special color storing section 201 stores the special color printing information as printing setting information for the print data. The variable magnification storing section 202 stores the variable magnification information as the printing setting information for the print data or the variable magnification information inputted by the user through the human interface 170.

Figure 15:
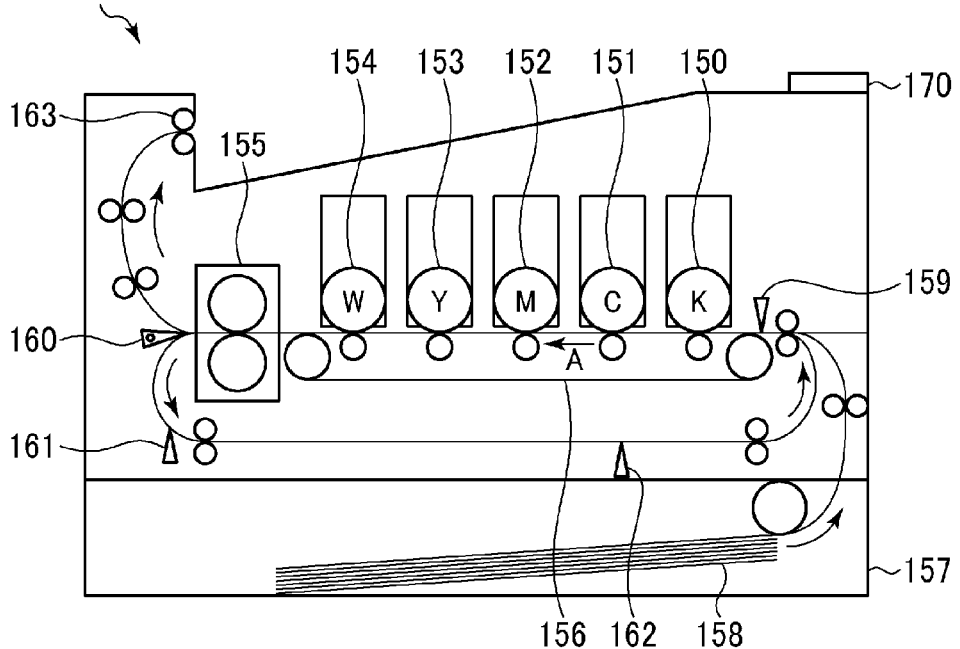
FIG. 15 illustrates the general configuration of an image forming apparatus according to the second embodiment.

FIG. 15 illustrates the outline of the configuration of the image forming apparatus according to the second embodiment. The printer 100 includes image drums 150-154 that forms toner images of black K, cyan C, magenta M, yellow Y and white W, respectively and transfers the toner images onto the print medium 158. A fixing unit 155 fixes the toner images on the print medium 158 by heat. A transport belt 156 transports the print medium 158 in a transport direction shown by arrow A. A tray unit 157 holds a stack of the print medium 158. A router 160 switches the path of the print medium 158 either to a path in which the print medium 158 advances to a discharge roller 163 onto a stacker or a path in which the print medium 158 advances through sensors 161, 162, and 159 back to the image drums 150-154.

In the second embodiment, the image drums 150-154 are aligned from upstream to downstream with respect to the direction of transport of the print medium along the transport path. The image forming section 130 shown in FIG. 14 controls the above-described sections to transfer the toner images produced in accordance with the print image data onto the print medium and fix the toner image on the print medium. The printer 100 is capable of printing images on the same print medium in a plurality of printing cycles of transferring and fixing.

A description will be given of the operation of the above-described configuration.

Figure 17A:
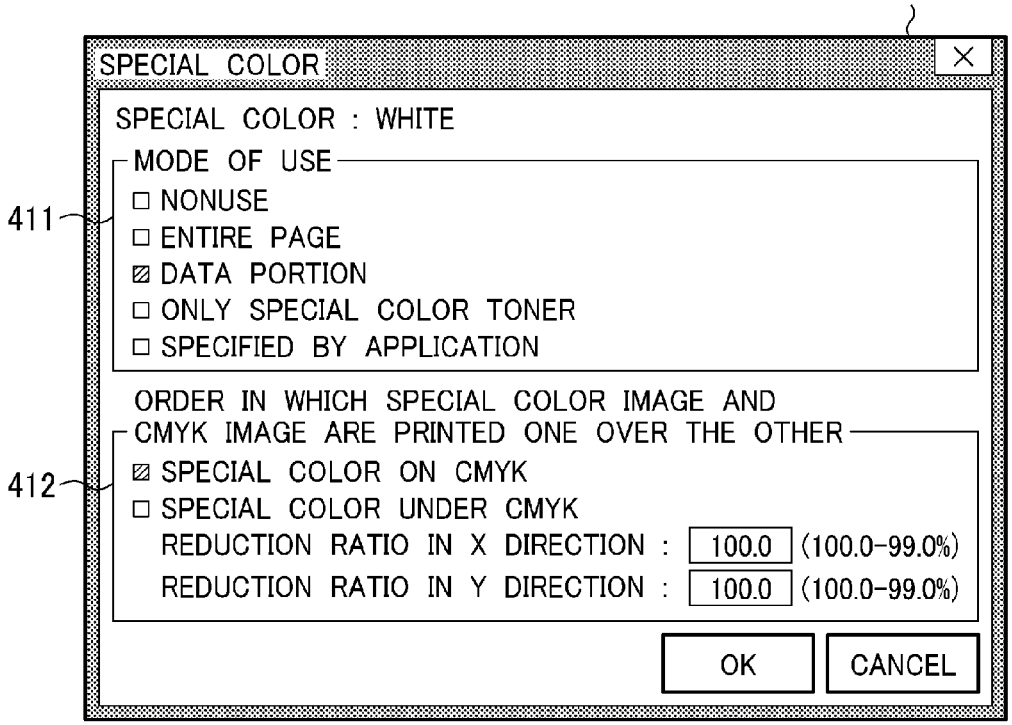
FIGS. 17A and 17B illustrate the setting screen of a printer driver of a personal computer.
Figure 17B:
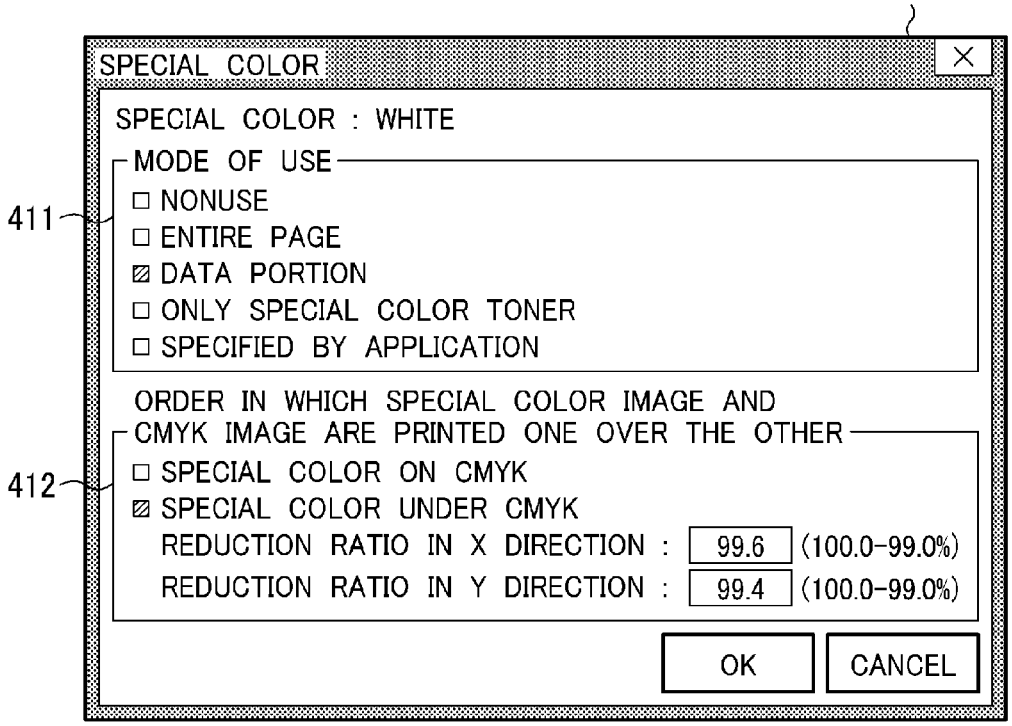

FIGS. 17A and 17B illustrate the setting screen 41 of the printer driver 101a, which operates on the PC 101 shown in FIG. 14. The setting screen 41 will first be described with reference to FIGS. 17A and 17B. When printing is performed using the special color, the user selects one of "nonuse,"

"entire page," "data portion," "only special color toner," and "specified by application" from a "mode of use" 411 of the setting screen 41. FIG. 17A illustrates the "mode of use" 411 when "data portion" was selected. In other words, the special color is used for the CMYK data.

When special color is, for example, white, which is overprinted on the CMYK image (color image) or printed underneath the CMYK image, the user selects "special color on CMYK" from an "order of overprinting" 412. FIG. 17A illustrates the "mode of use" 411 when "special color on CMYK" was selected. The printer 100 shown in FIG. 15 prints images of black K, cyan C, magenta M, yellow Y, and white W on the print medium in this order. In this case, a single transferring operation and a single fixing operation are required to print the images if the special color is to be printed on the CMYK image. However, two transferring operations and two fixing operations are required if the CMYK image is to be printed on the special color: the special color is transferred and fixed, and then the CMYK image is transferred and fixed.

As shown in FIG. 17A, if the user selects "special color on CMYK," the magnification ratios need not be specified and therefore "reduction ratio in a direction shown by X" and "reduction ratio in a direction shown by Y" are grayed out. As shown in FIG. 17B, if the user selects "special color under CMYK," "reduction ratio in the X direction" and "reduction ratio in the Y direction" are not grayed out so that the user can specify magnification ratio.

With the PC 101 shown in FIG. 14, if the user makes selection through the setting screen 41 shown in FIG. 17B and commands printing, the printer driver 101a of the PC 101 transmits items of information as print data to the printer 100 over the communication line 102: information for painting the special color on the "data portion" selected through the mode of use 411, information indicative of "special color under CMYK" specified at the "order of overprinting" 412, information indicative of magnification ratio (99.6% in the X direction and 99.4% in the Y direction), and the PDL data.

Figure 18:
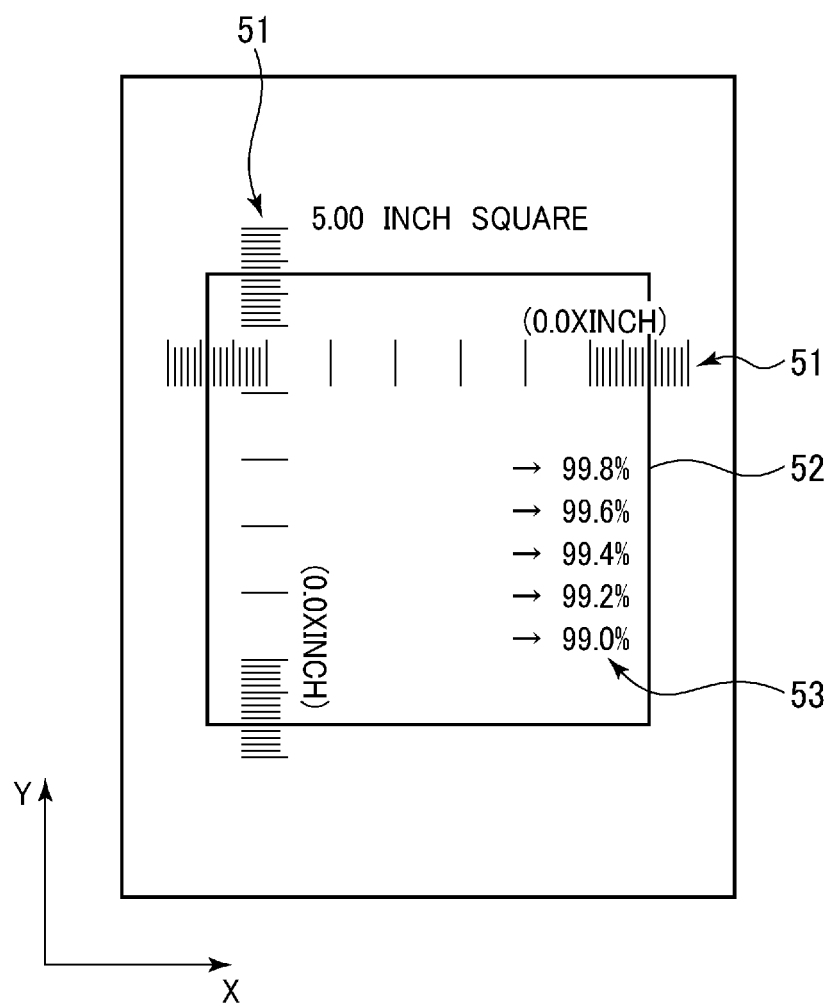
FIG. 18 illustrates how a magnification ratio or a reduction ratio is determined.

FIG. 18 illustrates how the magnification ratio or the reduction ratio is determined. A description will be given of the magnification ratio selected through the setting screen 41 of the printer driver 101a with reference to FIG. 18. Specific magnification ratios or reduction ratios are obtained by printing the special color image on a print medium. For example, the special color printing is performed as shown in FIG. 18 without magnification and reduction, thereby estimating an appropriate magnification ratio or reduction ratio. In FIG. 18, the images of scale, 51, extending in the X- and Y directions are transferred and fixed in the first printing operation. A 5.0 in. square image 52 is then transferred onto the print medium and is then fixed in the second printing operation, so that the square image 52 can be measured against the images of scale 51. Rough indications 53 may be printed either in the first printing operation or in the second printing operation, and should be printed with easy-to-read toner.

After having printed the images of scale, 51, and the square image 52, the dimensions of the square image 52 in the X and Y directions are measured against the images of scale 51, and then reduction ratios in the X and Y directions are determined from the rough indications 53, hence a magnification ratio. For example, if a reading of the dimension of the square image 52 against the image of scale, 51, is 5.0 inches, the reduction ratio is 99.8%. If a reading is 5.02 inches, the reduction ratio is 99.6%.

If the images of scale, 51, are printed with a special color, e.g., white so that the images of scale 51 cannot be easily read, the length of sides of the square image 52 in the X and Y directions are measured using a ruler after the print medium 82a, which has shrunk, returns to its original size some time after fixing.

The printing operation for measuring the reduction of the print medium may be incorporated in the printer 100, so that the user can activate the printing operation through the human interface 170 shown in FIGS. 14 and 15.

Figure 16:
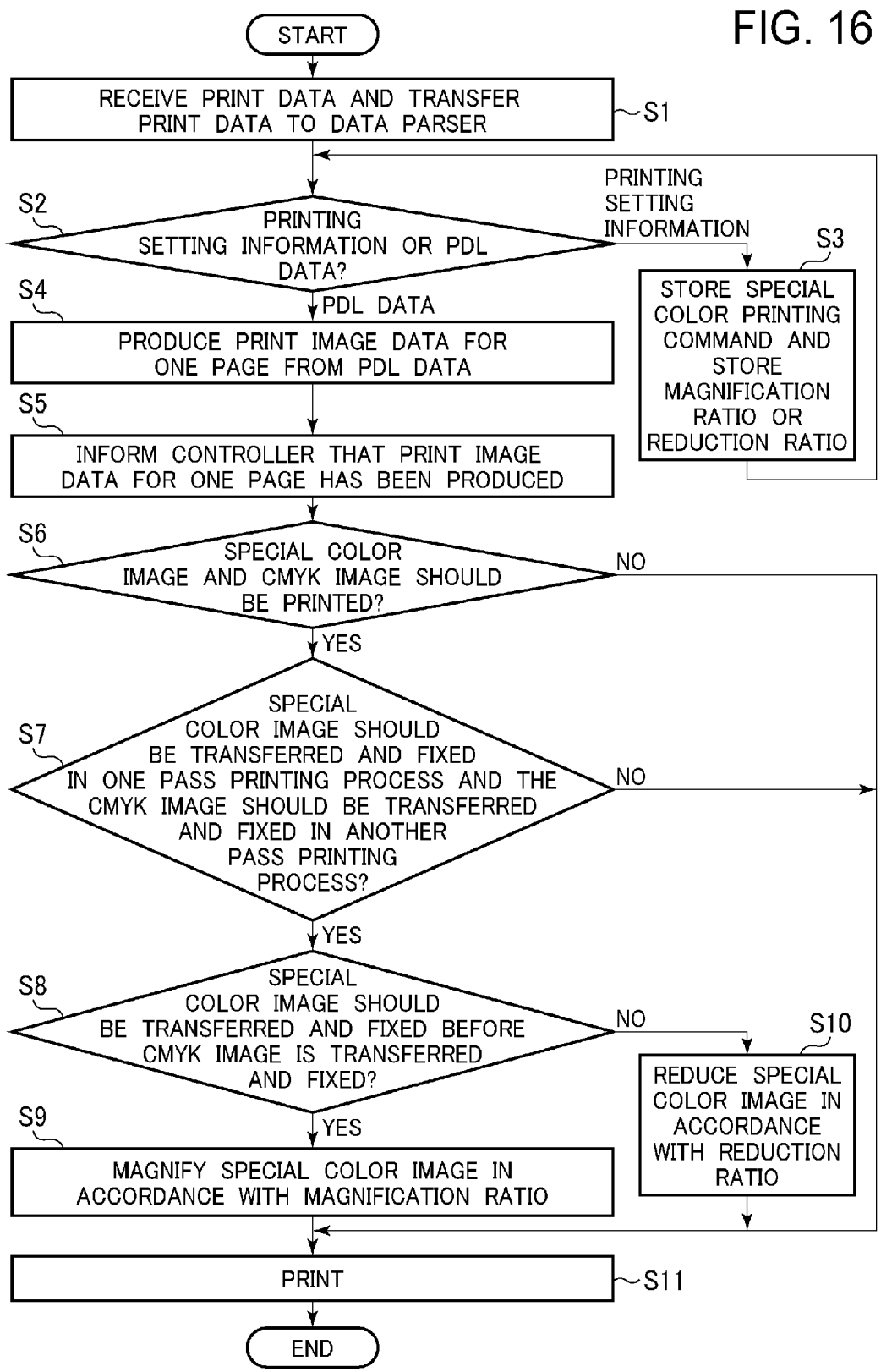
FIG. 16 is a flowchart illustrating the image forming process of a printer.

FIG. 16 is a flowchart illustrating the image forming process of the printer 100. A description will be given of the image forming process of the printer 100 with reference to FIGS. 14, 15, and 16.

S1: The data receiving section 110 receives the print data from the PC 101 over the communication line 102, and then transfers the received print data to the data parser 111.

S2: The data parser 111 performs parsing of the print data received from the data receiving section 110 and makes a decision as to whether the data is the printing setting information or the PDL data. If the data is the printing setting information, the program proceeds to S3. If the data is the PDL data, the program proceeds to S4.

S3: The data parser 111 stores the special color printing command into the special color storing section 201 and the magnification ratio or reduction ratio into the variable magnification storing section 202. The program jumps back to S2 where the data parser 111 waits for PDL data.

S4: The data parser 111 sends the PDL data to the print image producing section 112 which in turn produces the print image data to be printed. The print image producing section 112 produces the print image data for one page based on the special color printing command held in the special color storing section 201, the magnification ratio held in the variable magnification storing section 202, and the PDL data, and then stores the thus produced print image data for one page into the print image storing section 200.

A description will be given of the print image data produced by the print image producing section 112.

FIGS. 19A-19F illustrate an example of print image data produced by the print image producing section 112 at S4. FIGS. 20A and 20B illustrate the magnified print image. The PDL data describes the CMYK image shown in FIG. 19A. FIGS. 19B-19F illustrate a cyan image, a magenta image, a yellow image, and a black image, respectively. The special color printing command held in the special color storing section 201 is assumed to specify that the "data portion" is painted with the special color and "special color under CMYK" has been set.

Figure 19A:
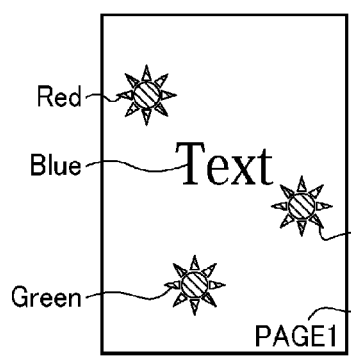
FIGS. 19A-19F illustrate an example of print image data produced by a print image producing section according to the second embodiment.
Figure 19B:
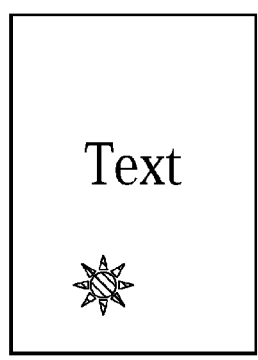
Figure 19C:
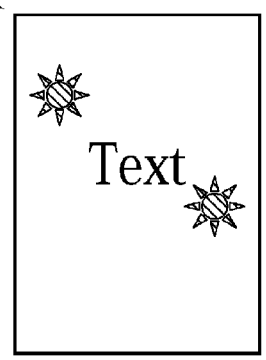
Figure 19D:
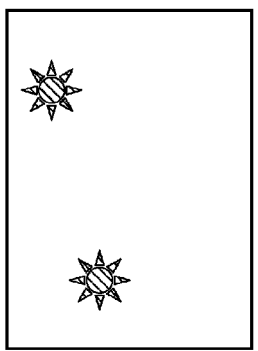
Figure 19E:
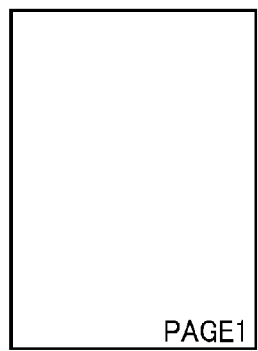
Figure 19F:
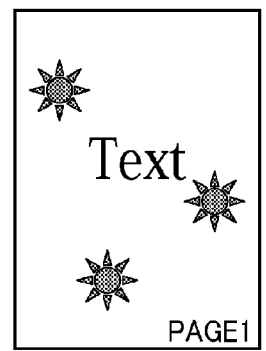
Figure 20A:
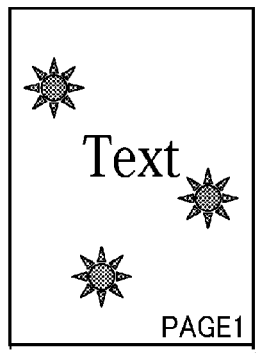
FIGS. 20A and 20B illustrate a magnified print image.
Figure 20B:
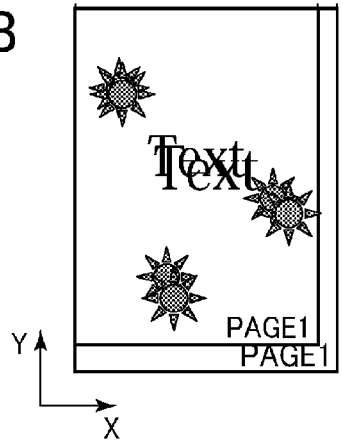

The print image producing section 112 produces the print image data for the print image of the respective colors (FIGS. 19B-19E) in accordance with the "special color for CMYK image" and the print image data for special color (e.g., white shown in FIG. 19F). If the "nonuse" is selected from the mode of use 411, the print image data for the special color is not produced. If the "only special color toner" is selected from the mode of use 411, the print image data for cyan, magenta, yellow, and black are not produced.

S5: The print image producing section 112 informs the controller 113 that the print image data for one page has been produced.

S6: Upon reception of the information that the print image data for one page has been produced, the controller 113 checks whether the magnification ratio for the special color image should be set.

If the mode of use of the special color printing command held in the special color storing section 201 indicates "nonuse" or "only special color toner," only one of the special color and the CMYK is printed. Thus, the controller 113 determines that since the printing of the image requires only one transferring operation and only one fixing operation, the magnification ratio or reduction ratio for the special color image need not be set. Therefore, the program proceeds to S11. In contrast, if the mode of use of the special color printing command held in the special color storing section 201 does not indicate "nonuse" or "only special color toner," the controller determines that both the special color and CMYK should be printed, and the program proceeds to S11.

S7: The controller 113 makes a decision as to whether the special color image should be transferred and fixed in one pass printing process and the CMYK image should be transferred and fixed in another pass printing process. This decision is made considering the order in which the image drums for forming images of the respective colors are aligned in the direction of transport path and the order in which the special color image (e.g., K-C-M-Y-W or W-K-C-M-Y) and the CMYK image are placed one over the other (e.g., special color image on the CMYK image or CMYK image on special color image). If the answer is YES, the program proceeds to S8. If the answer is NO, the program jumps to S11.

With the printer 100 in which the CMYK image is first transferred onto the print medium and the special color image (W) is then transferred onto the CMYK image, if the "order of overprinting" 412 indicates the "special color on CMYK," the controller determines that the special color image and the CMYK image can be printed by performing one transferring operation and one fixing operation. If the "order of overprinting" 412 indicates the "special color under CMYK," the controller determines that the special color image should be first transferred and fixed and then the CMYK image should be transferred and fixed. In other words, the special color image should be transferred and fixed before the CMYK image is transferred and fixed.

Suppose that the image drums 150-154 are aligned such that the image drum for white, 154, is disposed most upstream of the image drums 150-153. If the "order of overprinting" 412 indicates the "special color under CMYK," the controller 113 determines that the special color image and the CMYK image can be printed by performing one transferring operation and one fixing operation. If the "order of overprinting" 412 indicates the "special color on CMYK," the controller determines that the CMYK image should be first transferred and fixed and then the special color image should be transferred and fixed. In other words, the special color image should be transferred and fixed after the CMYK image is transferred and fixed.

S8: The controller 113 determines whether the special color image should be transferred and fixed before the CMYK image is transferred and fixed. If the answer is YES, the program proceeds to S9. If the answer is NO, the program proceeds to S10.

S9: The controller 113 instructs the variable magnification processing section 114 to magnify the special color image held in the print image storing section 200 in accordance with magnification ratios or reduction ratios held in the variable magnification storing section 202. If the reduction ratios held in the variable magnification storing section 202 are 99.6% in the X direction and 99.4% in the Y direction, the variable magnification processing section 114 magnifies the special color image (white) shown in FIG. 20A into the special color image shown in FIG. 20B by magnification ratios equal to 100.4% in the X direction and 100.6% in the Y direction.

As described above, if the controller 113 determines that a special color image should be transferred and fixed on the print medium before the CMYK image is transferred and fixed, the controller 113 instructs the variable magnification processing section 114 to magnify the special color image in accordance with magnification ratios held in the variable magnification storing section 202. Once the variable magnification processing section 114 completes the variable magnification process, the program proceeds to S11.

S10: The controller 113 instructs the variable magnification processing section 114 to reduce the special color image held in the print image storing section 200 in accordance with the reduction ratio held in the variable magnification storing section 202.

For example, if the magnification ratios held in the variable magnification storing section 202 are 99.6% in the X direction and 99.4% in the Y direction, the variable magnification processing section 114 reduces the special color image (white) by reduction ratios equal to 9.6% in the X direction and 99.4% in the Y direction. In this manner, if the controller 113 determines that the special color image should be transferred and fixed after the CMYK image is transferred and fixed, the controller 113 instructs the variable magnification processing section 114 to reduce the special color image by reduction ratios held in the variable magnification storing section 202.

Once the variable magnification processing section 114 completes the variable magnification process, the program proceeds to S11.

S11: The controller 113 instructs the image forming section 130 to print the print image held in the print image storing section 200. In accordance with the instruction from the controller 113, the image forming section 130 reads the print image data from the print image storing section 200. If both the special color image and the CMYK image are to be printed, the image forming section 130 prints the special color image and the CMYK image in registration on the print medium.

A description will be given of the registration of the special color image and CMYK image with reference to FIG. 21.

FIG. 21 illustrates position alignment of the print image in the second embodiment. Assuming that the mode of use 411 in FIG. 17B indicates "entire page" and the "order of overprinting" 412 indicates "special color under CMYK," and the magnification ratios are "reduction ratio in the X direction is 99.6%" and "reduction ratio in the Y direction" are 99.4%, and the special color image and the CMYK image are separately transferred and fixed, the transfer position or print position of the print image is such that the special color image and the CMYK image are always positioned in the middle of the print medium.

Figure 21A:
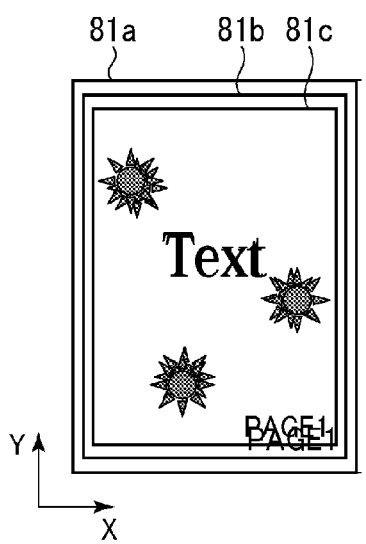
FIGS. 21A-21C illustrate position alignment of the print image in the second embodiment.
Figure 21B:
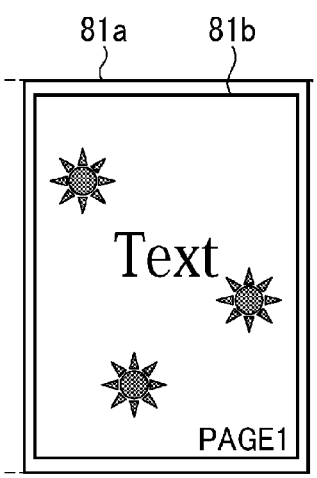

A CMYK image 81c shown in FIG. 21A is magnified into a special color image 81ba1. FIGS. 21A and 21B illustrate the special color image 81b after magnification printed on a print medium 81a such that the special color image 81b is centered in the X direction and in the Y direction. In other words, the special color image 81b sits on the print medium 81a with equal margins at its ends in the X direction and equal margins at its ends in the Y direction.

Figure 21C:
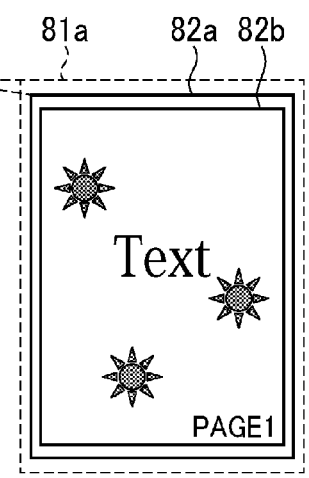

Referring to FIG. 21B, when the special color image 81b is transferred onto the print medium 81a and the print medium passes through the fixing unit 155 which in turn fixes the special color image 81ba1, both the print medium 81a and the special color image 81b shrink due to heat applied thereto as shown in FIG. 21C. The dotted lines show the print medium 81a before it shrinks. The reduction ratio of the print medium due to the first transferring operation and fixing operation is the reduction ratio that is set through the setting screen 41 of the printer driver 101a.

Figure 22A:
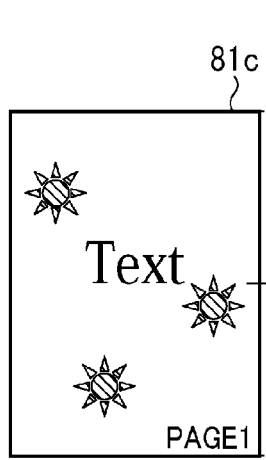
FIG. 22A-22C illustrate how a CMYK image looks when the CMYK image, which has not been magnified, is transferred onto a print medium.
Figure 22B:
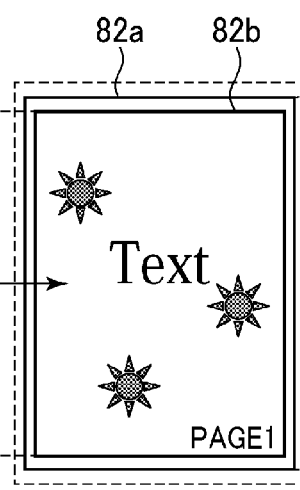
Figure 22C:
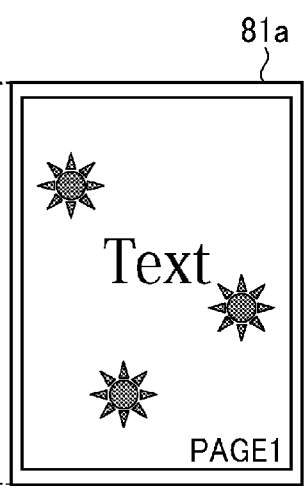

FIGS. 22A-22C illustrate how the CMYK image 81c looks when the CMYK image 81ca1, which has not been magnified, is transferred onto a print medium 82a. In this case, the printed CMYK image 81c has the same size as a special color image 82b that has been shrunk due to fixing.

The print medium 82a onto which the special color image 82b and the CMYK image 81c having the same size have been transferred, passes through the fixing unit 155, and the special color image 82b and the CMYK image 81c are fixed. The print medium. 82a is then discharged to the outside of the printer 100. The print medium 82a, which has shrunk, returns to its original size some time after fixing, so that the special color image and the CMYK image are accurately registered with each other and appear in the middle of the print medium 81a.

The resultant magnification of the images may be offset by, for example, configuring the PC 101 such that the printer driver 101a reduces the PDL data therein by a predetermined reduction ratio before the PDL is sent to the printer 100, in which case when the CMYK image is transferred onto the print medium and then fixed after the special color image is transferred onto the print medium and then fixed, the printer driver 101a produces the print data that contains the PDL data for the CMYK image and information about the inputted reduction ratio.

The printing control performed by the image forming section 130 will be described with reference to FIG. 15. When an image can be printed by a single transferring operation and a single fixing operation, the image forming section 130 pulls in the print medium 158 from the tray unit 157 onto the transport belt 156. The print medium 158 advances through the image drums 150-154 in sequence so that images of corresponding colors are transferred onto the print medium 158. The print medium 158 then passes through the fixing unit 155 so that the images on the print medium 158 are fixed. The router 160 is switched to guide the print medium 158 to the discharge roller 163 which in turn discharges the print medium 158 to the outside of the printer 100.

When printing requires two transferring operations and two fixing operations, the image forming section 130 pulls in the print medium 158 from the tray unit 157 onto the transport belt 156, and the image drum 154 transfers a white image on the print medium 158. The print medium 158 then passes through the fixing unit 155 so that the white image on the print medium 158 is fixed. The router 160 is switched to guide the print medium 158 through the sensors 161, 162, and 159 back to the image drums 150-154. The image drums 150-153 transfer cyan, magenta, yellow, and black images onto the special color image (white) that has been fixed on the print medium 158. The print medium 158 passes through the fixing unit 155 so that the cyan, magenta, yellow, and black images on the print medium 158 are fixed. The router 160 is then switched to guide the print medium 158 to the discharge roller 163 which in turn discharges the print medium 158 to the outside of the printer 100. This completes printing.

In the second embodiment, the reduction ratio of the print medium is set through the setting screen 41 of the printer driver 101a. The reduction ratio of the print medium may also be set by selecting a reduction ratio from the menu through inputting a selection into the human interface 170 of the printer 100. With a printer in which the transfer operation and fixing operation are performed a plurality of times on the same surface of a print medium, a special color image is transferred and fixed in a first pass printing process with the selected magnification ratios, and the a CMYK image is transferred and fixed on the special color image in a second pass printing process, so that the resultant image on the print medium is not significantly deteriorated.

It should be noted that the variable magnification process is not performed on the CMYK image which is transferred and fixed in the second pass printing process or after the second pass printing process. Instead, the variable magnification process is performed on the special color image which is transferred and fixed in the first pass printing process since the special color image transferred and fixed in the first pass printing process has a relatively high density. Thus, the deviation of dithering period, for example, is not detectable, minimizing deterioration of print quality. Further, the special color image and the CMYK image of the same size can be printed on the print medium while maintaining the image quality of the CMYK image.

In the second embodiment, when the special color image is transferred and fixed and then the CMYK image is transferred and fixed, the special color image is subjected to the variable magnification process and is then transferred and fixed while the CMYK image is not subjected to the variable magnification process. The invention is not limited to this. For example, the special color image formed of, for example, a transparent toner may be transferred and fixed one over the other a plurality of times, thereby adjusting gloss of the special color image or allowing image embossing.

When the special color image and the CMYK image are transferred and fixed in the first pass printing process and then the special color image is transferred in superposition and fixed in the second pass printing process, the special color image and the CMYK image in the first pass printing process may not be subjected to the variable magnification process but the special color image in the second pass printing process and after the second pass printing process may be subjected to the variable magnification process. For example, assume that the special color image and the CMYK image are transferred and fixed in the first pass printing process, the special color image is transferred and fixed in the second pass printing process, and the special color image is transferred and fixed in the third pass printing process. The special color image and the CMYK image in the first pass printing process may not be subjected to the variable magnification process, and the special color image in the second and third pass printing processes may be reduced in size and then transferred and fixed.

Assume that the special color image (gold) is transferred and fixed in the first pass printing process and the special color image (gold) is also transferred and fixed in the second pass printing process, and the CMYK image is transferred and fixed in the third pass printing process, i.e., the CMYK image is overprinted on a plurality of special color images formed as a background. The special color image (gold) in the first pass printing process may be magnified and the special color image (gold) in the second pass printing process and the CMYK image in the third pass printing process may not be subjected to the variable magnification process.

In a test printing for checking the magnification or reduction ratio, the special color image (e.g., white or transparent) may be replaced with an image of cyan or other color, thereby facilitating reading of a reduction ratio as well as minimizing costs.

In the second embodiment, an image is subjected to the variable magnification process so that the image is magnified or reduced with a selected magnification ratio or reduction ratio for the first pass printing process. Another image is then transferred onto the image printed in the first pass printing process, and is then fixed. This way of printing minimizes the chance of image quality deteriorating when a plurality of images are transferred and fixed in a plurality of steps.

Also, a special color image is subjected to the variable magnification process so that the special color image is magnified or reduced with a selected magnification ratio or reduction ratio for the first pass printing process. In this way, the special color image and the CMYK image of the same size can be printed on the print medium while maintaining the quality of the CMYK image.

What is claimed is:

1. An image forming apparatus, comprising:
   a receiving section configured to receive a first item of image data for producing a first image and a second item of image data for producing a second image;
   a magnifying section configured to magnify the first item of image data in accordance with a magnification ratio; and
   a printing section configured to transfer and fix the first image on a print medium based on the magnified first item of image data, and subsequently transfer and fix the second image on the print medium based on the second item of image data.

2. The image forming apparatus according to claim 1, wherein the printing section transfers and fixes the second image on a surface of the print medium on which the first image has been transferred and fixed.

3. The image forming apparatus according to claim 2, wherein the printing section transfers and fixes the second image so that the second image is overprinted on the first image.

4. The image forming apparatus according to claim 1, further comprising:
   a position correction specifying section configured to allow the user to specify a magnitude of position correction by which at least one of the first image and the second image is displaced on the print medium; and
   an image processing section configured to correct at least one of a print position of the first image and a print position of the second image in accordance with the magnitude of position correction.

5. The image forming apparatus according to claim 4, wherein the magnitude of position correction includes a magnitude of position correction in a first direction on the print medium and a magnitude of position correction in a second direction on the print medium, the second direction being substantially perpendicular to the first direction.

6. The image forming apparatus according to claim 4, wherein the first image is printed in a first pass printing process and the second image is printed in a second pass printing process, and the magnitude of position correction is applied in the first pass printing process and the second pass printing process.

7. The image forming apparatus according to claim 1, wherein the printing section is configured to print a test pattern from which the magnification ratio is determined.

8. An image forming apparatus comprising:
   a receiving section configured to receive a first item of image data for producing a first image and a second item of image data for producing a second image;
   an inputting section into which a user inputs one of a magnification ratio and a reduction ratio;
   a magnifying-and-reducing section configured to magnify the first item of image data in accordance with the magnification ratio when the magnification ratio is inputted, and to reduce the second item of image data in accordance with the reduction ratio when the reduction ratio is inputted; and
   a printing section configured to transfer and fix the first image on a print medium based on the magnified first item of image data, and subsequently transfer and fix the second image on the print medium based on the second item of image data.

9. The image forming apparatus according to claim 8, wherein the printing section transfers and fixes the second image on a surface of the print medium on which the first image has been transferred and fixed.

10. The image forming apparatus according to claim 9, wherein the printing section is configured to print a test pattern from which the magnification ratio is determined.

11. The image forming apparatus according to claim 9, wherein the printing section transfers and fixes the second image so that the second image is overprinted on the first image.

12. The image forming apparatus according to claim 9, further comprising:
    a position correction specifying section configured to allow the user to specify a magnitude of position correction by which at least one of the first image and the second image is displaced on the print medium; and
    an image processing section configured to correct at least one of a print position of the first image and a print position of the second image in accordance with the magnitude of position correction.

13. The image forming apparatus according to claim 12, wherein the magnitude of position correction includes a magnitude of position correction in a first direction on the print medium and a magnitude of position correction in a second direction on the print medium, the second direction being substantially perpendicular to the first direction.

14. The image forming apparatus according to claim 12, wherein the first image is printed in a first pass printing process and the second image is printed in a second pass printing process, and the magnitude of position correction is applied in the first pass printing process and the second pass printing process.

* * * * *